(12) United States Patent
Tsuda

(10) Patent No.: US 9,894,555 B2
(45) Date of Patent: Feb. 13, 2018

(54) INFORMATION PROCESSING METHOD FOR PROVIDING AN APPROPRIATE WIRELESS CONNECTION SERVICE TO A WIRELESS TERMINAL DEVICE

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 13/981,486

(22) PCT Filed: Jan. 30, 2012

(86) PCT No.: PCT/JP2012/051956
§ 371 (c)(1),
(2), (4) Date: Jul. 24, 2013

(87) PCT Pub. No.: WO2012/108285
PCT Pub. Date: Aug. 16, 2012

(65) Prior Publication Data
US 2013/0315061 A1    Nov. 28, 2013

(30) Foreign Application Priority Data
Feb. 7, 2011  (JP) .................................. 2011-023522

(51) Int. Cl.
*H04W 28/02* (2009.01)
*H04W 8/18* (2009.01)
(Continued)

(52) U.S. Cl.
CPC ....... *H04W 28/0247* (2013.01); *H04W 4/003* (2013.01); *H04W 8/183* (2013.01); *H04W 12/04* (2013.01); *H04W 88/06* (2013.01)

(58) Field of Classification Search
CPC ..... H04W 8/183; H04W 4/003; H04W 12/04; H04W 28/0247
(Continued)

(56) References Cited

U.S. PATENT DOCUMENTS

2003/0073438 A1* 4/2003 Fukushima et al. .......... 455/432
2003/0115081 A1* 6/2003 Ohtomo ............. G06Q 30/0283
705/400
(Continued)

FOREIGN PATENT DOCUMENTS

CN    1275750 A    12/2000
CN    1678125 A    10/2005
(Continued)

OTHER PUBLICATIONS

International Search Report and Written Opinion dated Apr. 3, 2012 for Application No. PCT/JP2012/051956.
(Continued)

*Primary Examiner* — Melvin Marcelo
*Assistant Examiner* — Natali N Pascual Peguero
(74) *Attorney, Agent, or Firm* — Chip Law Group

(57) ABSTRACT

Provided is an information processing method including a setting process of, when a service is provided to a first wireless terminal device having a first access right to access a base station related to a first communication service provider via a radio line, setting a second access right to access a base station related to a second communication service provider to the first wireless terminal device, and a service providing process of providing the service to the first wireless terminal device to which the second access right is set through the base station related to the second communication service provider.

14 Claims, 26 Drawing Sheets

(51) Int. Cl.
*H04W 4/00* (2009.01)
*H04W 12/04* (2009.01)
*H04W 88/06* (2009.01)

(58) Field of Classification Search
USPC .................................................. 370/229, 230
See application file for complete search history.

(56) References Cited

U.S. PATENT DOCUMENTS

| | | | | |
|---|---|---|---|---|
| 2003/0120754 | A1* | 6/2003 | Muto et al. | 709/220 |
| 2005/0221795 | A1* | 10/2005 | Hirabe et al. | 455/409 |
| 2006/0250960 | A1* | 11/2006 | Ando | 370/233 |
| 2007/0264965 | A1* | 11/2007 | Taniguchi | 455/403 |
| 2009/0069036 | A1* | 3/2009 | Yotsumoto | H04W 12/08 455/456.5 |
| 2009/0070540 | A1* | 3/2009 | Dewa | 711/163 |
| 2009/0197572 | A1* | 8/2009 | Feder | H04W 48/16 455/411 |
| 2009/0209282 | A1* | 8/2009 | Kobayashi et al. | 455/552.1 |
| 2009/0253403 | A1* | 10/2009 | Edge | H04W 76/007 455/404.2 |
| 2011/0269423 | A1* | 11/2011 | Schell | H04L 63/062 455/411 |

FOREIGN PATENT DOCUMENTS

| | | | |
|---|---|---|---|
| CN | 1783766 | A | 6/2006 |
| CN | 101771482 | A | 7/2010 |
| CN | 101771483 | A | 7/2010 |
| EP | 1009183 | A1 * 6/2000 | ............ H04W 48/18 |
| JP | 2002-078020 | | 3/2002 |
| JP | 2004-080691 | | 3/2004 |
| JP | 2005-203926 | | 7/2005 |
| JP | 2006-060295 | | 3/2006 |
| JP | 2009-503961 | A | 1/2009 |
| JP | 2009503961 | A | 1/2009 |
| JP | 2009-081559 | | 4/2009 |
| JP | 2009-515403 | A | 4/2009 |
| JP | 2009515403 | A | 4/2009 |
| JP | 2011-004026 | | 1/2011 |
| JP | 2011-528532 | | 11/2011 |
| WO | 2006/075399 | A1 | 7/2006 |
| WO | 2006075399 | A1 | 7/2006 |
| WO | WO 2006111569 | A1 * | 10/2006 |
| WO | WO 2010/008635 | | 1/2010 |
| WO | 2010144474 | A1 | 12/2010 |
| WO | 2010144479 | A2 | 12/2010 |

OTHER PUBLICATIONS

International Preliminary Report on Patentability dated Aug. 22, 2013 for Application No. PCT/JP2012/051956.
Office Action Received for Chinese Patent Application No. 2012-80007273.8 dated Dec. 8, 2015.
Office Action Received for Japanese Patent Application No. 2015-079659 dated Dec. 15, 2015.
Office Action received for Japanese Patent Application No. 2015-079659, dated Apr. 26, 2016, 8 pages of Office Action including 4 pages of English translation.
Office Action for CN Patent Application No. 201280007273.8, dated Feb. 8, 2017, 9 pages of Office Action and 14 pages of English Translation.
Office Action for JP Patent Application No. 2015-079659, dated Sep. 6, 2016, 7 pages of Office Action and 8 pages of English translation.
PCT/JP2012/051956, dated Apr. 3, 2012, International Search Report and Written Opinion.
PCT/JP2012/051956, dated Aug. 22, 2013, International Preliminary Report on Patentability.
Office Action for JP Patent Application No. 2015-079659, dated Nov. 21, 2016, 6 pages of Office Action.
Office Action for JP Patent Application No. 2015-079659, dated Nov. 21, 2017, 6 pages of Office Action and 6 pages of English Translation.

* cited by examiner

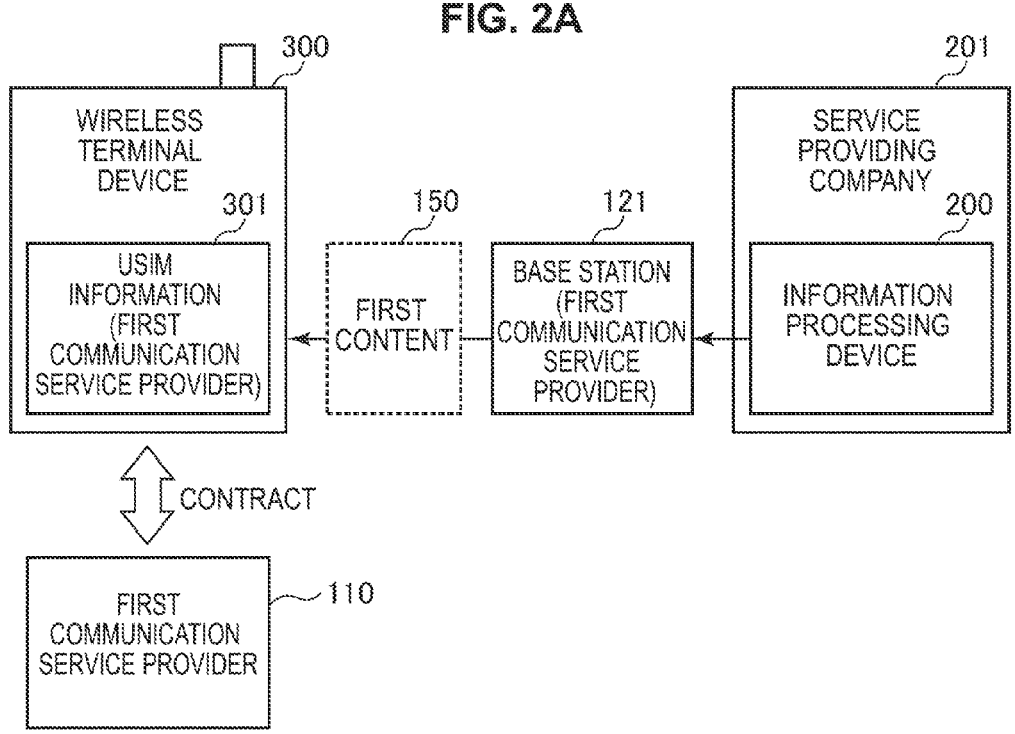
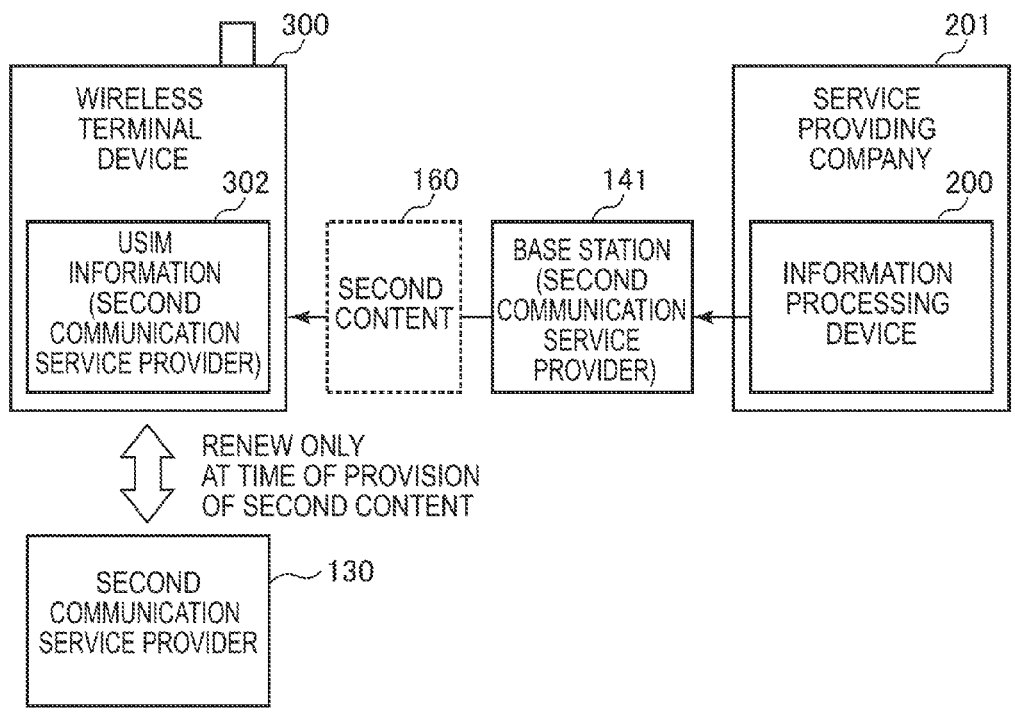

FIG. 3A

○○△△ONLINE SHOP
IS NOW HAVING SALE

FOR DETAILS, HERE    171 http://www.○○△△_net.co.jp/

COMPANY BEARS COMMUNICATION CHARGE !

170

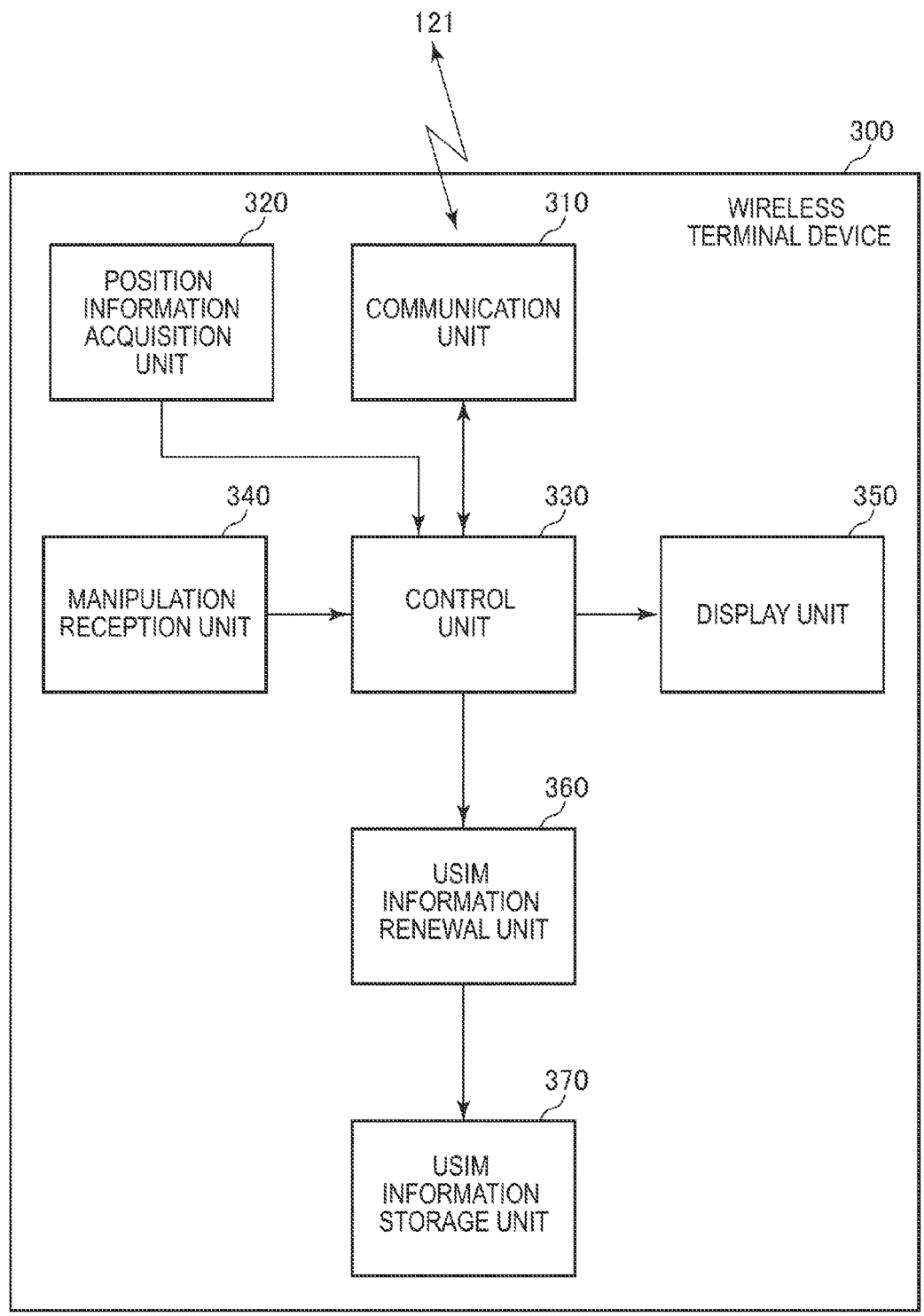

FIG. 7

260 ACCOUNTING INFORMATION HOLDING UNIT

SERVICE REQUESTOR Z
SERVICE REQUESTOR Y
SERVICE REQUESTOR X

| 261 | 262 | 263 | 264 | 265 | 266 | 267 |
|---|---|---|---|---|---|---|
| TERMINAL IDENTIFICATION INFORMATION | TIME INFORMATION | USED COMMUNICATION SERVICE PROVIDER INFORMATION | COMMUNICATION UNIT PRICE/kB | COMMUNICATION TRAFFIC VOLUME | COMMUNICATION CHARGE | CONTINGENCY FEE |
| 1111-0000-2222 | 2010/01/23 09:14:23 | FIRST COMMUNICATION SERVICE PROVIDER | ¥0.012 | 2,300kB | ¥27.6 | ¥50 |
| 1111-1234-5678 | 2010/01/23 09:15:12 | SECOND COMMUNICATION SERVICE PROVIDER | ¥0.015 | 3,400kB | ¥51.0 | ¥50 |
| ... | ... | ... | ... | ... | ... | ... |
| 1234-2222-4321 | 2010/01/23 23:55:45 | FIRST COMMUNICATION SERVICE PROVIDER | ¥0.010 | 3,100kB | ¥31.0 | ¥50 |

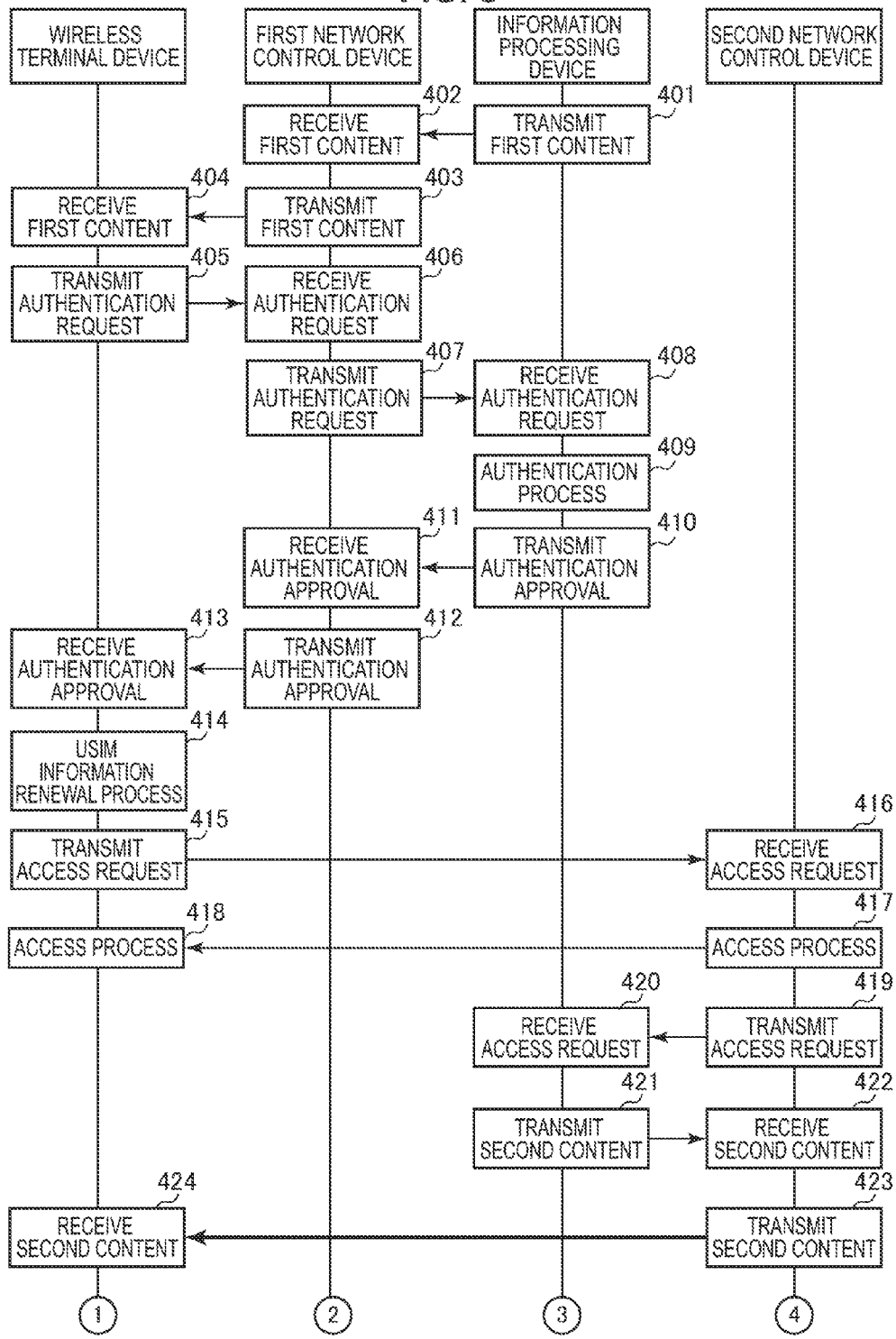

INFORMATION PROCESSING METHOD FOR PROVIDING AN APPROPRIATE WIRELESS CONNECTION SERVICE TO A WIRELESS TERMINAL DEVICE

TECHNICAL FIELD

The present disclosure relates to an information processing method, and more particularly, to an information processing method, an information processing device, and a communication system for wireless communication.

BACKGROUND ART

Conventionally, wireless terminal devices accessing networks such as public wireless networks have spread widely. Further, portable telephone service of a 3G scheme (called a third generation in Japan) was started in 2002. In this portable telephone service, initially, a small capacity of packets such as sounds or emails were primary applications. However, with the introduction of HSDPA (High Speed Downlink Packet Access) or the like, a use action of users is being changed to downloading of packets having a relatively large size such as downloading of music files and watching of videos.

Further, traffic is assumed to be concentrated locally due to users being concentrated in a specific area (a base station) and downloading a large capacity of packets. In this case, a problem is generated, for example, in that a sufficient communication rate is not obtained.

Therefore, for example, a distribution system in which, when a content distribution request from a wireless terminal device is made, it is determined whether the distribution is performed according to a reception environment in the wireless terminal device has been proposed (e.g., see Patent Literature 1).

CITATION LIST

Patent Literature

Patent Literature 1: Japanese Patent Laid-Open No. 2002-78020

SUMMARY OF INVENTION

Technical Problem

In the above-mentioned related art, when the reception environment in the wireless terminal device is not good, the distribution of content to the wireless terminal device is not performed. In this case, for example, the distribution itself stops or a determination of the reception environment is performed after a predetermined period has elapsed and it is determined again whether the distribution is performed according to the reception environment.

However, when the reception environment in the wireless terminal device is not good and distribution of content to the wireless terminal device is not performed, it is difficult for the user to receive appropriate wireless connection service at a desired timing. In this case, a service provider performing content distribution misses an opportunity to distribute content.

It is desirable to provide an appropriate wireless connection service.

Solution to Problem

According to a first embodiment of the present technology, there is provided an information processing method and a program for causing a computer to execute the method, the method including a setting process of, when a service is provided to a first wireless terminal device having a first access right to access a base station related to a first communication service provider via a radio line, setting a second access right to access a base station related to a second communication service provider to the first wireless terminal device, and a service providing process of providing the service to the first wireless terminal device to which the second access right is set through the base station related to the second communication service provider. Thus, there is an effect by which when the service is provided to the first wireless terminal device having the first access right through the radio line, the second access right is set to the first wireless terminal device, and the service is provided to the first wireless terminal device to which the second access right is set through the base station related to the second communication service provider.

Further, provision of the service may be transmission of first content including setting information related to the second communication service provider and second content related to the first content. The setting process may include setting the second access right to the first wireless terminal device when an access request based on the setting information is received after the first content is transmitted through the base station related to the first communication service provider. The service providing process may include transmitting the second content to the first wireless terminal device to which the second access right is set through the base station related to the second communication service provider. Thus, there is an effect by which when an access request based on setting information is received after the first content is transmitted through the base station related to the first communication service provider, the second access right is set to the first wireless terminal device, and the second content is transmitted to the first wireless terminal device to which the second access right is set through the base station related to the second communication service provider.

Further, the setting process may include updating the setting information related to the second communication service provider based on position information of the first wireless terminal device. Thus, there is an effect by which the setting information related to the second communication service provider is updated based on the position information of the first wireless terminal device.

Further, the setting process may include transmitting the setting information to set the second access right to the first wireless terminal device and setting the second access right to the first wireless terminal device based on the setting information. Thus, there is an effect by which the setting information to set the second access right is transmitted to the first wireless terminal device, and the second access right is set to the first wireless terminal device based on the setting information.

Further, the setting information may include contract authentication information related to the second access right. The setting process may include setting the second access right to the first wireless terminal device by renewing contract authentication information held in the first wireless terminal device to the contract authentication information included in the transmitted setting information. Thus, there is an effect by which the second access right is set to the first wireless terminal device by renewing contract authentication information held in the first wireless terminal device to contract authentication information included in the transmitted setting information.

Further, the first wireless terminal device may hold contract authentication information related to the first access right and contract authentication information related to the second access right, and performs the access right setting process by a validation nullification process of each contract authentication information. The setting information may include validation information to set the second access right. The setting process may include setting the second access right to the first wireless terminal device by validating the contract authentication information related to the second access right held in the first wireless terminal device based on validation information included in the transmitted setting information. Thus, there is an effect by which the second access right is set to the first wireless terminal device by validating contract authentication information related to the second access right held in the first wireless terminal device based on validation information included in the transmitted setting information.

Further, the information processing method may further include a restoring process of setting the first access right to the first wireless terminal device when provision of the service through the base station related to the second communication service provider ends after the second access right is set. Thus, there is an effect by which the first access right is set to the first wireless terminal device when provision of the service through the base station related to the second communication service provider ends after the second access right is set.

Further, the information processing method may further include an accounting process of charging a fee related to communication performed after the first wireless terminal device accesses the base station related to the second communication service provider based on the second access right after the second access right is set as a fee related to a provider providing the service. Thus, there is an effect by which a fee related to communication performed after the first wireless terminal device accesses the base station related to the second communication service provider, based on the second access right, after the second access right is set, is charged as a fee related to a provider providing the service.

Further, the information processing method may further include an extraction process of extracting a wireless terminal device present in a place in which a congestion degree satisfies a predetermined condition as the first wireless terminal device based on the congestion degree of each base station and the position of each wireless terminal device accessing each base station. Thus, there is an effect by which a wireless terminal device present in a place in which a congestion degree satisfies a predetermined condition is extracted based on the congestion degree of the base station and the position of each wireless terminal device accessing each base station.

Further, the extraction process may include acquiring and using the congestion degree of each base station from a wireless terminal device accessible to a corresponding base station. Thus, there is an effect by which a congestion degree of each base station is acquired from a wireless terminal device accessible to a corresponding base station and used.

Further, the service providing process may include deciding a size of content related to the service based on an expected communication rate calculated based on a signal power to interference power ratio and a congestion degree detected by a wireless terminal device accessing each base station and a position of each wireless terminal device accessing each base station. Thus, there is an effect by which a size of content related to the service is decided based on an expected communication rate and a position of each wireless terminal device accessing each base station.

Further, the information processing method may further include an extraction process of extracting a wireless terminal device present in a place in which a communication charge satisfies a predetermined condition as the first wireless terminal device based on communication charge information in each base station and a position of each wireless terminal device accessing each base station. Thus, there is an effect by which a wireless terminal device present in a place in which a communication charge satisfies a predetermined condition is extracted based on communication charge information in each base station and a position of each wireless terminal device accessing each base station.

Further, according to a second embodiment of the present technology, there is provided an information processing device, an information processing method, and a program for causing a computer to execute the method, the information processing device including a control unit that performs control in a manner that, when a service is provided to a first wireless terminal device having a first access right to access a base station related to a first communication service provider via a radio line, a second access right to access a base station related to a second communication service provider is set to the wireless terminal device, and a service providing unit that provides the service to the wireless terminal device to which the second access right is set through the base station related to the second communication service provider. Thus, there is an effect by which when the service is provided to the wireless terminal device having the first access right through the radio line, the second access right is set to the wireless terminal device, and the service is provided to the wireless terminal device to which the second access right is set through the base station related to the second communication service provider.

Further, according to a third embodiment of the present technology, there is provided a communication system, an information processing method, and a program for a computer to execute the method, the communication system including a wireless terminal device having a first access right to access a base station related to a first communication service provider, and an information processing device that includes a control unit performing control in a manner that, when a service is provided to the wireless terminal device via a radio line, a second access right to access a base station related to a second communication service provider is set to the wireless terminal device and a service providing unit providing the service to the wireless terminal device to which the second access right is set through the base station related to the second communication service provider. Thus, there is an effect by which when the service is provided to the wireless terminal device having the first access right through the radio line, the second access right is set to the wireless terminal device, and the service is provided to the wireless terminal device to which the second access right is set through the base station related to the second communication service provider.

Advantageous Effects of Invention

According to the present invention, there is an excellent effect by which an appropriate wireless connection service can be provided.

BRIEF DESCRIPTION OF DRAWINGS

FIG. 2A is a simplified diagram illustrating an example in which a wireless terminal device 300 receives content from an information processing device 200 according to the first embodiment of the present invention.

FIG. 2B is a simplified diagram illustrating an example in which the wireless terminal device 300 receives content from the information processing device 200 according to the first embodiment of the present invention.

FIG. 3A is a diagram illustrating an example of content displayed on the wireless terminal device 300 according to the first embodiment of the present invention.

FIG. 5 is a block diagram illustrating an example functional configuration of the wireless terminal device 300 according to the first embodiment of the present invention.

FIG. 7 is a diagram schematically illustrating an example of holding content of an accounting information holding unit 260 according to the first embodiment of the present invention.

FIG. 8 is a sequence chart illustrating an example communication process between devices configuring the communication system 100 according to the first embodiment of the present invention.

DESCRIPTION OF EMBODIMENTS

Figure 1:
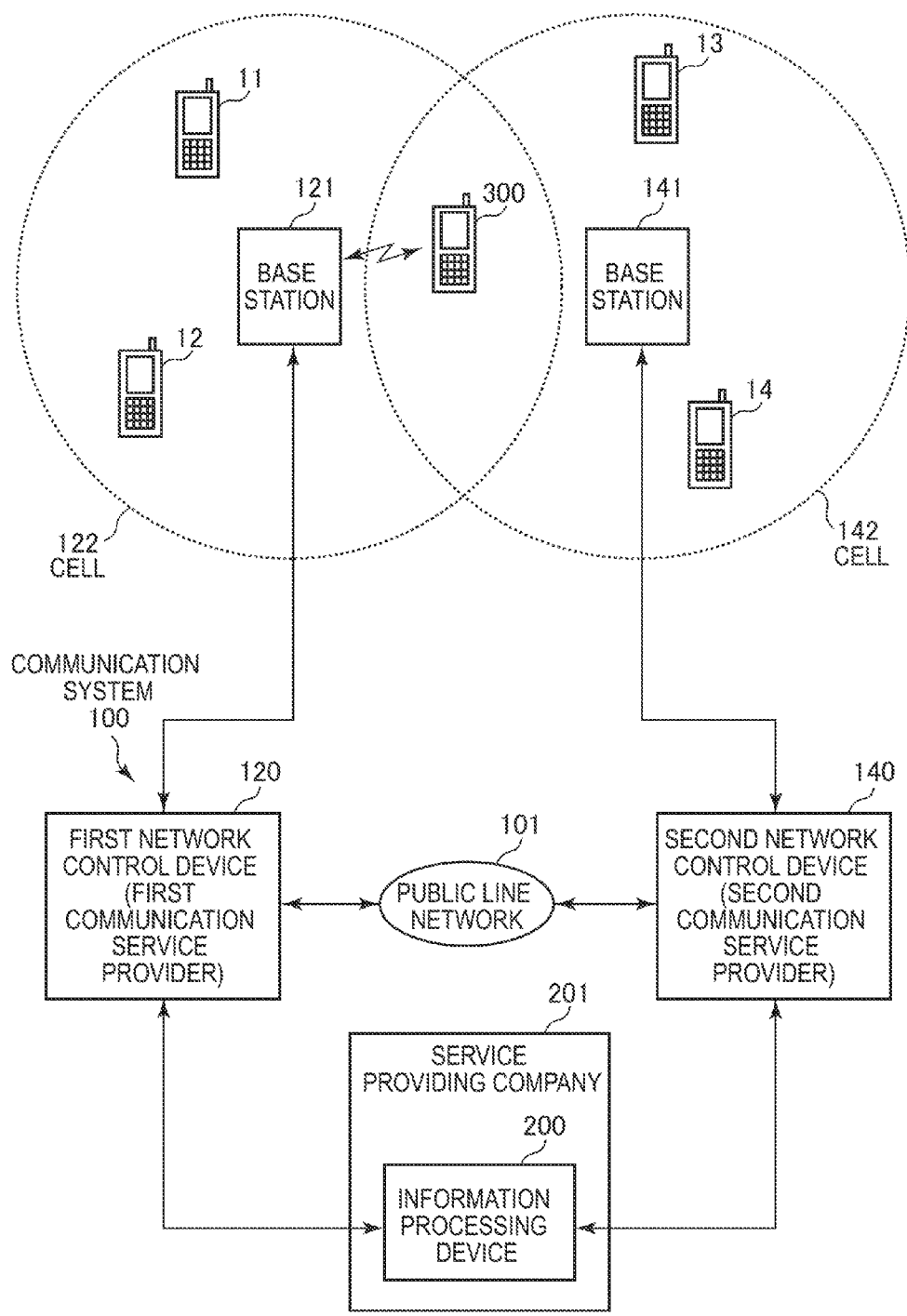
FIG. 1 is a block diagram illustrating a system example configuration of a communication system 100 according to a first embodiment of the present invention.

Hereinafter, preferred embodiments of the present invention will be described in detail with reference to the appended drawings. Note that, in this description and the drawings, elements that have substantially the same function and structure are denoted by the same reference numerals and only described once.

Hereinafter, modes (hereinafter, referred to as "embodiments") for carrying out the present invention will be described. The description will proceed in the following order.

1. First embodiment (USIM information renewal control: example of renewing USIM information to receive specific wireless connection service)

2. Second embodiment (USIM information renewal control: example of transmitting content to wireless terminal device present at an appropriate position using congestion degree information or the like)

1. First Embodiment

[Example Configuration of Communication System]

FIG. 1 is a block diagram illustrating a system example configuration of a communication system 100 according to a first embodiment of the present invention.

The communication system 100 includes a public line network 101, a first network control device 120, a second network control device 140, base stations 121 and 141, an information processing device 200, and a plurality of wireless terminal devices (11 to 14, 300, or the like). For example, the wireless terminal device 300 is a portable telephone device (e.g., a portable telephone device or a smart phone having a call function and a data communication function), a data communication device (e.g., a personal computer) having a wireless communication function, or the like.

The public line network 101 is a public line network such as a telephone network or the Internet. The public line network 101, the first network control device 120, and the second network control device 140 are connected to one another through a gateway (not shown).

The base station 121 is not only a base station operated by a first communication service provider 110 illustrated in FIGS. 2A and 2B, but also a mobile communication base station (NodeB) that connects the wireless terminal device holding USIM information of the first communication service provider 110 with the first network control device 120 via a radio line. Here, the USIM information is an example of contract authentication information, and the contract authentication information is information including telephone subscriber information and authentication key (Authentication) information. In other words, the user owning the wireless terminal device 300 has a wireless connection service contract with the first communication service provider 110. The contract includes a contract by which the user owning the wireless terminal device 300 can use the base station 121 operated by the first communication service provider 110.

The base station 141 is not only a base station operated by a second communication service provider 130 illustrated in FIGS. 2A and 2B, but also a mobile communication base station (NodeB) that connects a wireless terminal device holding USIM information of the second communication service provider 130 with the second network control device 140 via a radio line. Further, the first communication service provider 110 and the second communication service provider 130 are mobile communication service providers providing wireless connection service.

In FIG. 1, a range (wireless communication coverage) within which a radio wave of the base station 121 reaches and a range (wireless communication coverage) within which a radio wave of the base station 141 reaches are schematically illustrated as a cell 122 and a cell 142, respectively.

In an embodiment of the present invention, a base station is assumed to mean both the base station itself and a cell identified by the base station. For example, in an embodiment of the present invention, a contract to use a base station is assumed to also mean a contract to use a cell identified by the base station.

In FIG. 1, for convenience, only the first communication service provider 110 and the second communication service provider 130 are illustrated as the communication service providers, but the present invention can be similarly applied to an example in which three or more communication service providers are present. Further, in FIG. 1, for convenience, only the base stations 121 and 141 are respectively illustrated as base stations operated by the communication service providers, but the present invention can be similarly applied to an example in which three or more base stations operated by the communication service providers are present.

The first network control device 120 is a communication control device managed by the first communication service provider 110 providing wireless connection service, and performs authentication control of a wireless terminal device connected via the base station 121. Further, the first network control device 120 connects an authenticated wireless terminal device to the public line network 101 via a gateway (not shown).

The second network control device 140 is a communication control device managed by the second communication service provider 130 providing wireless connection service, and performs authentication control of a wireless terminal device connected via the base station 141. Further, the second network control device 140 connects an authenticated wireless terminal device to the public line network 101 via a gateway (not shown).

Here, the first network control device 120 authenticates only a wireless terminal device holding USIM information (contract authentication information) except for a specific case among wireless terminal devices accessed via the base stations 121. Further, similarly, the second network control device 140 authenticates only a wireless terminal device holding effective USIM information (contract authentication information) except for a specific case among wireless terminal devices accessed via the base stations 141. Further, the specific case is, for example, a case in which an outgoing call is made for an urgent use (e.g., a case in which an outgoing call directed to police, a fire department or the like is made).

The first network control device 120 or the second network control device 140 outputs various pieces of information transmitted from each wireless terminal device via each base station to the information processing device 200, and transmits various pieces of information output from the information processing device 200 to each wireless terminal device via each base station.

The information processing device 200 is an information processing device (e.g., a content providing server) run by a service providing company 201. The service providing company 201 is a service provider that performs various kinds of communication services such as a content distribution service. Further, the information processing device 200 performs a renewal process and a restoration process of USIM information of a wireless terminal device based on information from the first network control device 120 and the second network control device 140. Here, a communication service provider providing a wireless connection service, an MVNO (Mobile Virtual Network Operator) (a service provider of a business form called a so-called virtual communication service provider), or the like is assumed as the service provider performing various kinds of communication services. The information processing device 200 will be described in detail with reference to FIG. 6.

[Content Distribution Example]

FIGS. 2A and 2B are diagrams illustrating a simplified example in which the wireless terminal device 300 receives content from the information processing device 200 according to the first embodiment of the present invention.

FIG. 2A illustrates an example in which the wireless terminal device 300 receives first content 150 from the information processing device 200 through the base station 121.

As described above, the user owning the wireless terminal device 300 has a wireless connection service contract with the first communication service provider 110. In other words, as illustrated in FIG. 2A, the wireless terminal device 300 holds the USIM information 301 of the first communication service provider 110 and is thus able to use a mobile telephone network of the first communication service provider 110.

Here, in order not to put a burden on the user owning the wireless terminal device 300, for example, the service providing company 201 operating the information processing device 200 is considered to bear a communication charge to provide content to the wireless terminal device 300. However, a congestion degree of the base station 121 (the first communication service provider 110) to which the wireless terminal device 300 is wirelessly connected may be high, and the communication charge through the base station 121 (the first communication service provider 110) may be high. In this case, since the communication charge borne by the service providing company 201 is high, it may be difficult for the service providing company 201 to efficiently provide content.

In this regard, in the first embodiment of the present invention, as illustrated in FIG. 2B, when second content 160 (larger in capacity than the first content 150) is provided from the service providing company 201, the USIM information 301 in the wireless terminal device 300 is renewed. In other words, when the second content 160 is provided from the service providing company 201, the USIM information 301 held in the wireless terminal device 300 is renewed to USIM information 302 of the communication service provider (the second communication service provider 130) designated by the service providing company 201. Further, when provision of the second content 160 from the service providing company 201 ends, a state (the USIM information 301) before renewal is restored.

[Content Display Example]

Figure 3B:
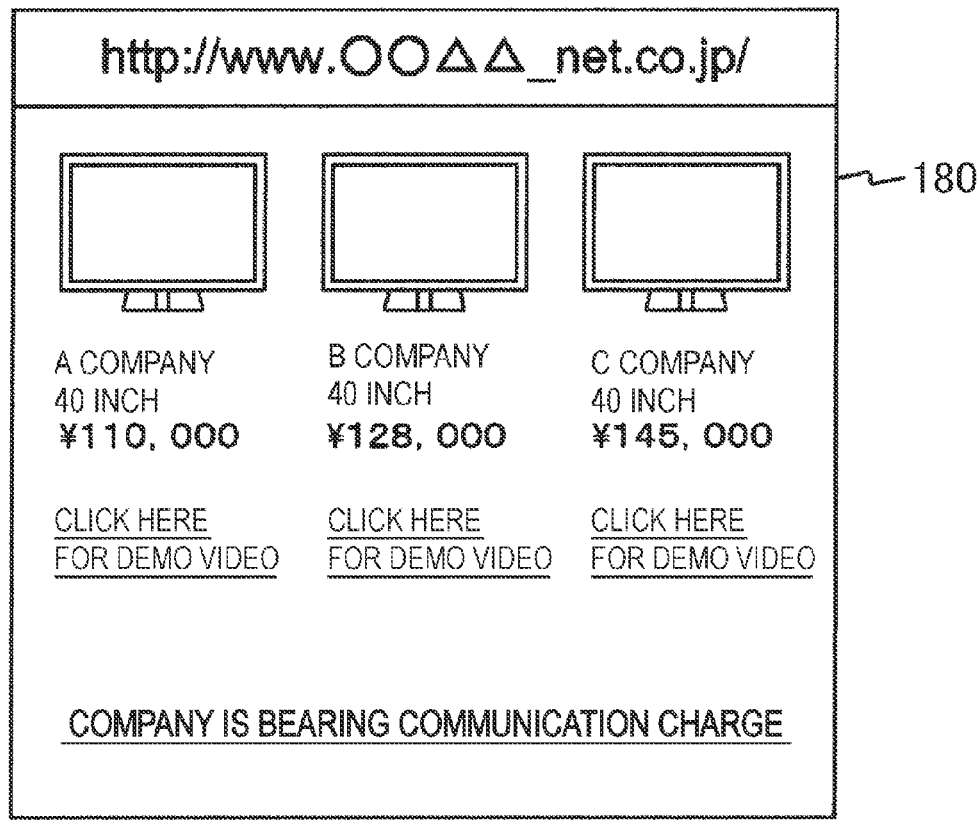
FIG. 3B is a diagram illustrating an example of content displayed on the wireless terminal device 300 according to the first embodiment of the present invention.

FIGS. 3A and 3B are diagrams illustrating a display example of content displayed on the wireless terminal device 300 according to the first embodiment of the present invention.

FIG. 3A illustrates a display example (a display screen 170) when the first content 150 (content transmitted from the information processing device 200 to the wireless terminal device 300 through the base station 121) illustrated in FIG. 2A is displayed.

The display screen 170 is a display screen through which the user checks content of the first content 150 transmitted from the information processing device 200 through the base station 121. Specifically, content (e.g., ○○△△ online shop is now having a sale) of the first content 150 and access destination setting information 171 related to an access destination connected when viewing content in further detail are displayed on the display screen 170. The access destination setting information 171 corresponds to access destination setting information 152 illustrated in FIG. 4 (b).

FIG. 3B illustrates a display example (a display screen 180) of when the second content 160 (content transmitted from the information processing device 200 to the wireless terminal device 300 through the base station 141) illustrated in FIG. 2B is displayed.

The display screen 180 is a display screen through which the user checks content of the second content 160 transmitted from the information processing device 200 through the base station 141. For example, the first content 150 to be initially transmitted is assumed to be text information having a relatively small capacity since the user bears the communication charge. However, the second content 160 transmitted after renewal of USIM information can be content having a relatively large capacity since the content provider bears communication charge.

[Example Configuration of Content]

Figure 4A:
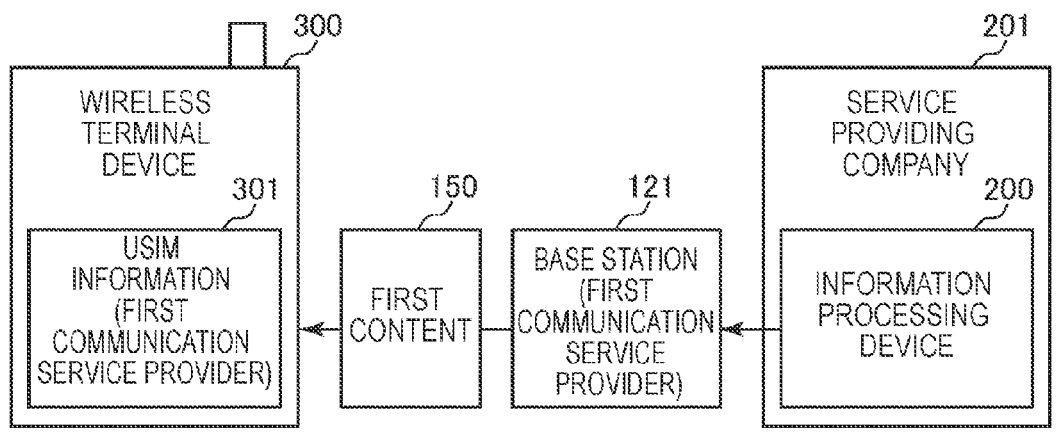
FIG. 4A is a diagram illustrating an example configuration of content transmitted from the information processing device 200 according to the first embodiment of the present invention.
Figure 4B:
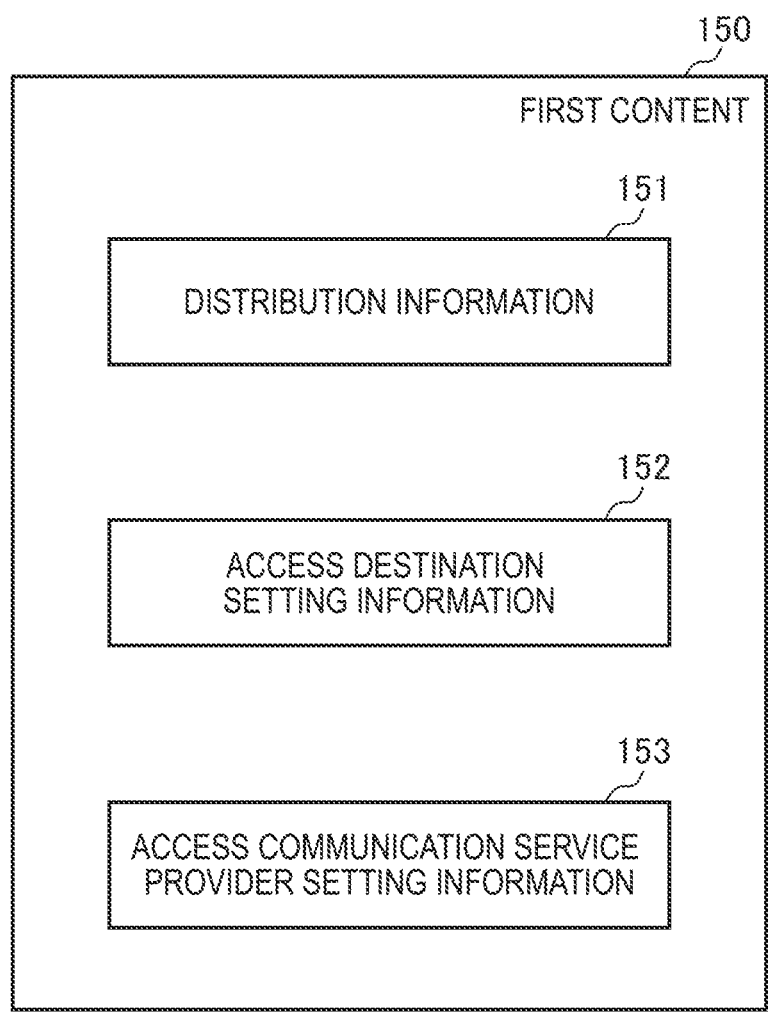
FIG. 4B is a diagram illustrating an example configuration of content transmitted from the information processing device 200 according to the first embodiment of the present invention.

FIGS. 4A and 4B are diagrams illustrating an example configuration of content to be transmitted from the information processing device 200 according to the first embodiment of the present invention.

FIG. 4A illustrates an example in which the wireless terminal device 300 receives the first content 150 from the information processing device 200 through the base station 121. FIG. 4A is the same as FIG. 4A except that the first communication service provider 110 is omitted.

FIG. 4B schematically illustrates pieces of information configuring the first content 150. The first content 150 includes distribution information 151, the access destination setting information 152, and access communication service provider setting information 153. In other words, the first content 150 includes setting information (the distribution information 151, the access destination setting information 152, and the access communication service provider setting information 153) related to the second communication service provider. Further, when the first content 150 is transmitted based on a request of a service provider (e.g., a service requestor 190 illustrated in FIG. 6) different from the service providing company 201, the setting information includes service provider identification information used to identify the corresponding service provider.

The distribution information 151 is information to be initially checked by the user and is preferably information (e.g., text information) having a relatively small capacity. For example, the distribution information 151 may include overall information such as advertising information, image content, video content, music content, news, weather forecast, traffic information, and the like. Further, only text information or null information may be used. In the case of a blank, the user can understand content of content based on the access destination setting information 152.

The access destination setting information 152 is information used to set an access destination for accessing information associated with the distribution information 151. For example, the access destination setting information 152 is information such an URL (Uniform Resource Locator) of information associated with the distribution information 151, an IP address of a server in which information associated with the distribution information 151 is stored, a file name, and the like.

The access communication service provider setting information 153 is information necessary to access a base station of a communication service provider used to access information associated with the distribution information 151. In other words, the access communication service provider setting information 153 is information necessary to access a base station of a communication service provider decided in the information processing device 200. Further, when the communication service provider runs a plurality of radio systems, a type of radio system is identified, and a decision is made.

For example, the first content 150 is assumed to be distributed to the wireless terminal device 300. In this case, after the user browses information included in the distribution information 151, the user can access information associated with the distribution information 151 using the access destination setting information 152. When a user manipulation for obtaining access is performed, the wireless terminal device 300 makes a setting so that communication can be performed with a communication service provider designated by the service providing company 201 based on the access communication service provider setting information 153 included in the first content 150.

Here, as a method of making a setting so that communication can be performed with the communication service provider designated by the service providing company 201, a method of renewing to the USIM information related to the designated communication service provider may be used. For example, the user of the wireless terminal device 300 performs an authentication process with the contracted communication service provider (the first communication service provider 110) and then renews to the USIM information related to the designated communication service provider so that a valid state is maintained during a predetermined period of time (or during a specific session). As another method, a method in which a plurality of pieces of USIM information are held in the wireless terminal device 300, and one of them is validated, and when communication is performed with the designated communication service provider, information related to the designated communication service provider is validated may be used. Further, as another method, for example, a method of removing a restriction of the designated communication service provider may be used.

Using the methods, when text information having a small capacity is used as content to be initially distributed, and then access is made to content having a large capacity, the user can use the communication service provider designated by the service providing company 201.

Thus, communication can be performed with the communication service provider designated by the service providing company 201. In this case, since the communication charge is borne by the content provider, the user can be easily provided content having a relatively large capacity.

Thus, the user provided with content can enjoy the content without bearing the communication charge. Further, the content provider providing content bears the communication charge but can sufficiently show the user desired content. In other words, a service that satisfies a content providing side and a content receiving side can be sufficiently provided.

Further, the decision of access to information associated with the distribution information 151 may be made by the user's selection as described above, or may be automatically made. Further, all pieces of information serving as the distribution information 151 may not be included in the first content 150, and access to the access destination setting information 152 may be made using the access communication service provider setting information 153. In this case, the first content 150 may have a form of a message or a command to acquire overall information such as advertising information, image content, video content, music content, news, weather forecasts, traffic information, and the like.

In this example, the access communication service provider setting information 153 is included in the first content 150, and the information 153 and the content 150 are transmitted at the same time. However, for example, the access communication service provider setting information 153 may be periodically transmitted in a regularly updated form. In this case, when access to information associated with the distribution information 151 is made using the access destination setting information 152, a first access communication service provider setting information may be acquired, and a communication service provider of an access target may be selected. For example, a communication service provider of an access target can be selected based on an inexpensive or high-rate index. In this case, information (e.g., a communication service provider name) related to a communication service provider of an access target may or may not be displayed. Further, a setting on an index to be based among the inexpensive or high-rate indices can be transmitted together with the access communication service provider setting information.

[Example Configuration of Wireless Terminal Device]

FIG. 5 is a block diagram illustrating an example functional configuration of the wireless terminal device 300 according to the first embodiment of the present invention. Functional configurations of the other wireless terminal devices are substantially the same as the wireless terminal device 300, and thus a description thereof will be omitted here.

The wireless terminal device 300 includes a communication unit 310, a position information acquisition unit 320, a control unit 330, a manipulation reception unit 340, a display unit 350, a USIM information renewal unit 360, and a USIM information storage unit 370. The wireless terminal device 300 is implemented, for example, by a portable telephone device capable of performing a call and data communication. An illustration and description of a microphone, a speaker, and the like are omitted.

The communication unit 310 is a communication unit that includes a receiving unit receiving a radio signal transmitted from each base station and a transmitting unit transmitting a radio signal to each base station, and supports a plurality of wireless communication services. For example, the communication unit 310 can perform communication according to CDMA (Code Division Multiple Access) or OFDMA (Orthogonal Frequency Division Multiple Access). Here, the CDMA stands for code division multiple access, and the OFDMA stands for orthogonal frequency division multiple access.

The position information acquisition unit 320 acquires position information indicating a position in which the wireless terminal device 300 is present, and outputs this acquired position information to the control unit 330. For example, the position information acquisition unit 320 can be realized by a GPS unit that calculates the position information based on a GPS (Global Positioning System) signal received by a GPS signal receiving antenna. Each piece of data about a position such as latitude, longitude, and altitude at the time of reception of the GPS signal is included in the calculated position information. Further, a position information acquisition device that acquires the position information using another position information acquisition method may be used. For example, a position information acquisition device that derives position information using access point information by a wireless LAN (Local Area Network) present in the vicinity and acquires this position information may be used.

The control unit 330 performs various controls based on a control program stored in a memory (not illustrated). The control unit 330 includes, for example, a microprocessor. For example, the control unit 330 accesses the communication unit 310, and performs transmission and reception of various data, which is performed with the first network control device 120 and the second network control device 140 accessed via the base stations 121 and 141.

The manipulation reception unit 340 is a manipulation reception unit that receives a manipulation input manipulated by a user, and outputs a signal corresponding to the received manipulation input to the control unit 330. The manipulation reception unit 340 includes, for example, various keys such as numeric keys or alphabetic keys.

The display unit 350 is a display unit that displays various pieces of information (letter information, time information or the like) based on control of the control unit 330. For example, the display unit 350 displays each piece of information (e.g., a display screen illustrated in FIG. 3) on before and after renewal of the USIM information. Further, for example, a display panel such as an organic EL (Electro Luminescence) panel or an LCD (Liquid Crystal Display) panel may be used as the display unit 350. Further, the manipulation reception unit 340 and the display unit 350 may be integrally configured using a touch panel that enables a user to perform a manipulation input by touching or approaching a display surface with his or her finger.

The USIM information renewal unit 360 performs a renewal process for the USIM information (contract authentication information) held in the USIM information storage unit 370 based on control of the control unit 330. Here, a state in which USIM information related to the first communication service provider 110 is held can be recognized as a state in which it has an access right to access the base stations 121 related to the first communication service provider 110. For example, transfer of the access right can be performed through a validation process and a nullification process for the USIM information. Further, the transfer of the access right can be performed through a transfer process for the USIM information itself.

The USIM information storage unit 370 is a memory that holds the USIM information (contract authentication information). For example, a UICC (Universal Integrated Circuit) card may be used as the USIM information storage unit 370, or a dedicated memory for securely holding the USIM information may be used. Further, when a UICC card is used as the USIM information storage unit 370, a UICC card in which the USIM information is not written to be fixed but a validation process and a nullification process for the USIM information is allowed is used. In other words, a UICC card allowing the USIM information renewal unit 360 to perform the validation process and the nullification process for the USIM information is used. Further, a UICC card allowing the renewal process for USIM information is used. Further, for the validation process and the nullification process for USIM information, a validation process and a nullification process defined by 3GPP (Third Generation Partnership Project) may be performed. Each process is performed, for example, at a sale shop of portable telephone devices.

[Example Configuration of Information Processing Device]

Figure 6:
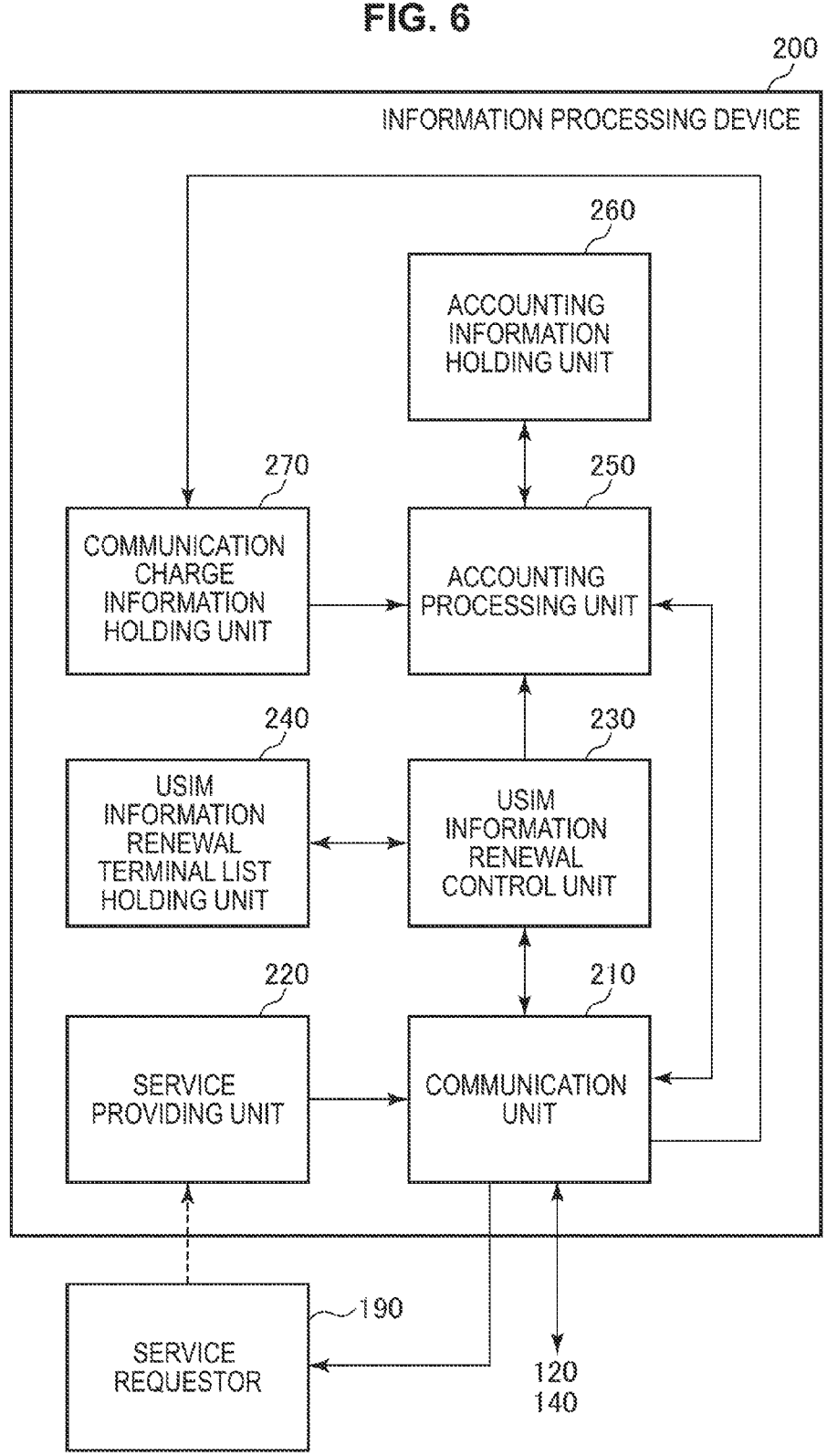
FIG. 6 is a block diagram illustrating an example functional configuration of the information processing device 200 according to the first embodiment of the present invention.

FIG. 6 is a block diagram illustrating an example functional configuration of the information processing device 200 according to the first embodiment of the present invention.

The information processing device 200 includes a communication unit 210, a service providing unit 220, a USIM information renewal control unit 230, a USIM information renewal terminal list holding unit 240, an accounting processing unit 250, an accounting information holding unit 260, and a communication charge information holding unit 270. The service requestor 190 is, for example, a service provider that requests transmission of content to a desired wireless terminal device. In other words, in the first embodiment of the present invention, based on a request of a service provider (the service requestor 190) different from the service providing company 201, distribution of requested information (content) can be performed.

The communication unit 210 receives each piece of information (e.g., access request) transmitted from each wireless terminal device through the first network control device 120 or the second network control device 140. Further, the communication unit 210 outputs each piece of information to the USIM information renewal control unit 230, the accounting processing unit 250, and the communication charge information holding unit 270. Further, the communication unit 210 transmits various kinds of contents output from the service providing unit 220 to each wireless terminal device through the first network control device 120 or the second network control device 140. Further, the communication unit 210 detects the fact that the wireless terminal device accesses information associated with the distribution information 151, and outputs the detection result to the accounting processing unit 250.

The service providing unit 220 provides various kinds of contents to each wireless terminal device. For example, according to a request from the service requestor 190, the service providing unit 220 transmits requested content (e.g., the first content 150 or the second content 160) to the wireless terminal device 300 through the communication unit 210. Further, when the service providing unit 220 transmits the first content 150 to the wireless terminal device 300, each piece of information (the distribution information 151, the access destination setting information 152, and the access communication service provider setting information 153) included in the first content 150 is output to the accounting processing unit 250. Further, the accounting processing unit 250 performs an accounting process based on each piece of information included in the first content 150.

When a service is provided to a wireless terminal device holding an access right (an access right based on USIM information) through a radio line, the USIM information renewal control unit 230 performs control such that another access right is set to the wireless terminal device. Further, when another access right is set and then provision of a service through a base station related to the communication service provider ends, the USIM information renewal control unit 230 performs control such that an initial access right is set to the wireless terminal device. In other words, the USIM information renewal control unit 230 performs the renewal process and the restoration process of the USIM information on a wireless terminal device of a target. Further, the USIM information renewal control unit 230 causes information related to the wireless terminal device that has performed the renewal process of the USIM information to be held in the USIM information renewal terminal list holding unit 240. Further, when provision of certain content (e.g., the second content 160) by the service providing unit 220 ends, the USIM information renewal control unit 230 performs the restoration process of the USIM information on the wireless terminal device to which the content has been transmitted. After the restoration process is performed, the USIM information renewal control unit 230 deletes the information related to the wireless terminal device from the USIM information renewal terminal list holding unit 240. Further, the USIM information renewal control unit 230 is an example of a control unit set forth in the accompanying claims.

The USIM information renewal terminal list holding unit 240 holds the information related to the wireless terminal device (USIM information renewal terminal list) on which the renewal process of the USIM information has been performed through the USIM information renewal control unit 230. Further, the USIM information renewal terminal list holding unit 240 supplies the held information to the USIM information renewal control unit 230.

The accounting processing unit 250 calculates a fee related to communication performed by the wireless terminal device, performs the accounting process, and causes each piece of information calculated by the accounting process to be held in the accounting information holding unit

260. In other words, after a new access right is set (after the USIM information is renewed), the accounting processing unit 250 charges a fee related to communication performed after the wireless terminal device is connected with the base station related to the communication service provider based on the access right as a fee related to the service provider. For example, the accounting processing unit 250 calculates a communication charge related to the wireless terminal device using access information from the communication unit 210, information (information related to a communication charge) stored in the communication charge information holding unit 270, and accounting information stored in the accounting information holding unit 260. For example, when the communication unit 210 detects the fact that the wireless terminal device accesses the information associated with the distribution information 151, the accounting processing unit 250 acquires information (information identifying a communication service provider) included in the access communication service provider setting information 153. Further, the accounting processing unit 250 calculates a communication charge by an accounting method corresponding to the communication service provider, and causes information related to a communication charge necessary to access the information associated with the distribution information 151 to be held in the accounting information holding unit 260. In this case, the accounting processing unit 250 assigns accounting information to each service requestor, and causes the accounting information to be held in the accounting information holding unit 260.

As described above, a settlement process with a communication service provider included in the access communication service provider setting information 153 can be performed by the service providing company 201 operating the information processing device 200, and each service requestor can be billed. Thus, a communication charge necessary to distribute the first content 150 can be charged to the user of the wireless terminal device 300, and after a new access right is set (after the USIM information is renewed), a communication charge necessary to distribute the second content 160 can be charged to each service requestor. Further, the service providing company 201 may send a bill to the user of the wireless terminal device 300 without sending a bill to the service requestor based on a contract between the service requestor and the user of the wireless terminal device 300.

The accounting information holding unit 260 holds accounting information related to a communication process performed by the wireless terminal device after the USIM information renewal, and supplies the stored accounting information to the accounting processing unit 250. Further, the accounting information holding unit 260 can hold any other information as well as the accounting information related to the communication process performed by the wireless terminal device after the USIM information renewal. For example, as illustrated in FIG. 7, for example, when advertising content is distributed to the wireless terminal device 300, information related to a contingency fee 267 that the service providing company 201 charges a content distributor or the like can be held.

Further, the communication unit 210 outputs a communication charge included in the accounting information held in the accounting information holding unit 260. For example, when a predetermined period of time expires, the communication unit 210 outputs the communication charge to the service requestor 190 through each network control device.

Further, the communication unit 210 acquires information related to a communication unit price from the first network control device 120 and the second network control device 140, and causes the acquired information to be held in the communication charge information holding unit 270. Further, the communication unit 210 regularly or irregularly acquires each piece of information from the first network control device 120 and the second network control device 140, and sequentially updates information held in the communication charge information holding unit 270.

The communication charge information holding unit 270 is a holding unit that holds the information related to the communication charge. Further, the communication charge information holding unit 270 supplies the held information (the information related to the communication charge) to the accounting processing unit 250.

[Example Content of Accounting Information Holding Unit]

FIG. 7 is a diagram schematically illustrating an example of holding content of the accounting information holding unit 260 according to the first embodiment of the present invention.

The accounting information holding unit 260 is a holding unit that holds accounting information (e.g., a communication charge related to transmission of the second content) related to the service requestor that has requested the service providing company 201 to transmit various kinds of content. Specifically, the accounting information holding unit 260 holds terminal identification information 261, time information 262, used communication service provider information 263, communication unit price 264, a communication traffic volume 265, a communication charge 266, and the contingency fee 267 in association with one another for each service requestor.

The terminal identification information 261 is identification information identifying a wireless terminal device to which the second content has been transmitted.

The time information 262 is information (e.g., a start time, an end time, and a communication period of time) related to a time at which the second content is transmitted to the wireless terminal device.

The used communication service provider information 263 is information related to the communication service provider used when the second content is transmitted to the wireless terminal device.

The communication unit price 264 is a communication unit price related to a communication charge incurred when the second content is transmitted to the wireless terminal device.

The communication traffic volume 265 is communication traffic volume when the second content is transmitted to the wireless terminal device.

The communication charge 266 is information related to a communication charge incurred when the second content is transmitted to the wireless terminal device.

The contingency fee 267 is information related to a contingency fee charged when the second content is transmitted to the wireless terminal device and the transmission is completed. As described above, separately from the accounting information related to the communication charge, when the user downloads the information (second content) associated with the distribution information 151, the service requestor of the second content is billed. Thus, for example, since a fee related to advertising distribution is charged based on an action, an advertising distribution system that optimizes cost-effectiveness can be provided.

FIG. 7 illustrates simplified content of each piece of information, but each time when the second content is transmitted to the wireless terminal device, history information related to the transmission is assumed to be recorded, and a total amount is assumed to be calculated by sequentially adding communication charges related to the transmission.

[Example Communication Between Devices]

Figure 9:
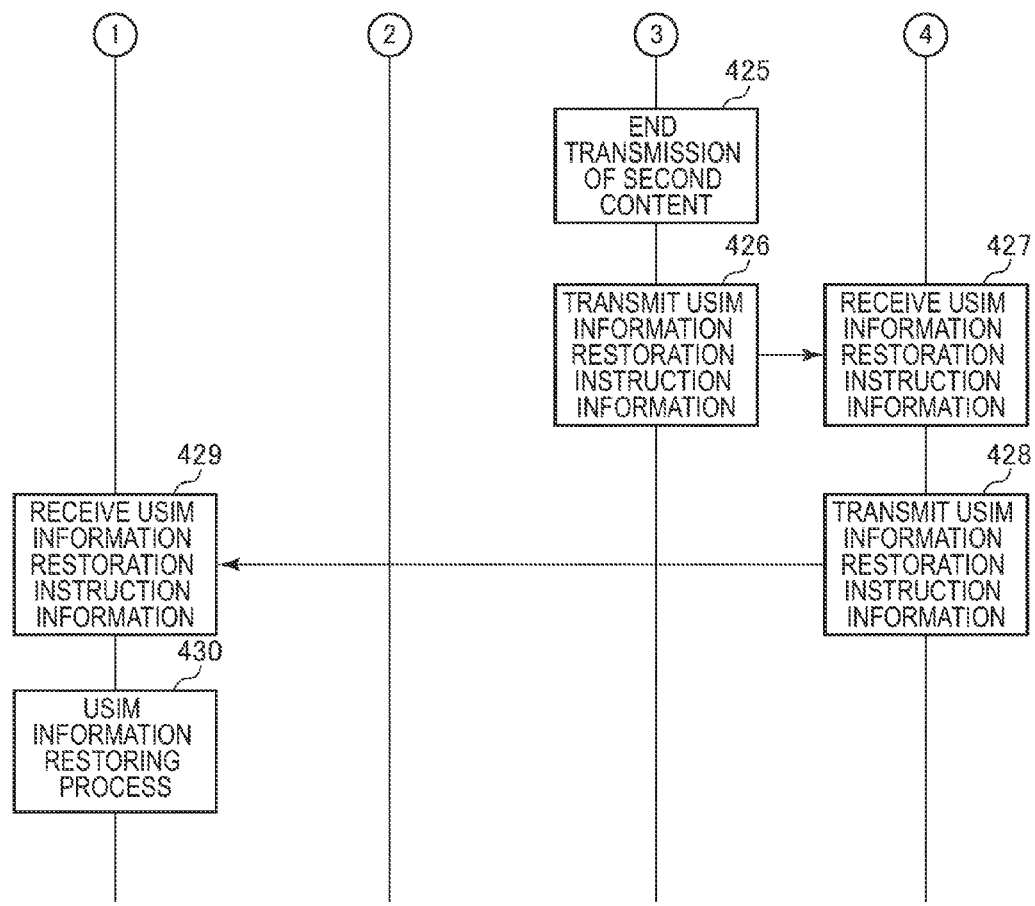
FIG. 9 is a sequence chart illustrating an example communication process between devices configuring the communication system 100 according to the first embodiment of the present invention.

FIGS. 8 and 9 are sequence charts illustrating an example communication process between devices configuring the communication system 100 according to the first embodiment of the present invention. FIGS. 8 and 9 illustrate only the communication process example between the wireless terminal device 300 and the information processing device 200, but the present invention can be similarly applied to the communication process between another wireless terminal device and the information processing device 200.

Further, FIGS. 8 and 9 illustrate an example in which the renewal process and the restoration process are performed on the USIM information when the wireless terminal device 300 holds the USIM information related to the first communication service provider 110. Further, FIGS. 8 and 9 will be described in connection with an example of the communication process when the USIM information held in the wireless terminal device 300 is renewed according to transmission of the first content 150 from the information processing device 200.

First, the first content 150 is transmitted from the information processing device 200 to the wireless terminal device 300 through the first network control device 120 (401 to 404). In other words, the first content 150 is transmitted to the wireless terminal device 300 using a wireless access network of the first communication service provider 110. Further, when the first content 150 is received by the wireless terminal device 300, for example, the display screen 170 illustrated in FIG. 3(a) is displayed on the display unit 350.

Then, for example, in the wireless terminal device 300, a user manipulation for requesting provision of the second content 160 corresponding to the first content 150 is made. For example, when a selection manipulation (e.g., click manipulation) to select the access destination setting information 171 is made in a state in which the display screen 170 illustrated in FIG. 3 (a) is displayed on the display unit 350, access to an access destination related to the access destination setting information 171 is activated. In other words, an authentication request to access the access destination (the second communication service provider) related to the access destination setting information 171 is transmitted from the wireless terminal device 300 to the information processing device 200 through the first network control device 120 (405 to 408). In this example, the authentication request is made and transmitted by the user's manual manipulation, but the authentication request may be automatically transmitted.

When the authentication request is received from the wireless terminal device 300 (408), the authentication process is performed between the wireless terminal device 300 that has received the authentication request and the information processing device 200 (409). Then, when the wireless terminal device 300 is authenticated by the authentication process (409), an authentication approval representing that authentication is approved is transmitted from the information processing device 200 to the wireless terminal device 300 through the first network control device 120 (410 to 413). The authentication approval includes information used to renew the USIM information (the first communication service provider) stored in the USIM information storage unit 370 of the wireless terminal device 300 to the USIM information (the second communication service provider) used to access the second network control device 140.

Further, when the wireless terminal device 300 receives the authentication approval (413), the USIM information renewal unit 360 of the wireless terminal device 300 renews the USIM information stored in the USIM information storage unit 370 based on the authentication approval (414). In other words, the USIM information related to the first communication service provider 110 is renewed to the USIM information related to the second communication service provider 130. Through the renewal process, the wireless terminal device 300 can have access to the second communication service provider 130 (the second network control device 140).

As described above, when the renewal process of the USIM information is performed, information representing that the renewal process of the USIM information has been performed may be displayed. In this case, it is possible to easily understand that the user owning the wireless terminal device 300 has performed the renewal process of the USIM information.

Then, when the renewal process of the USIM information ends (414), the control unit 330 of the wireless terminal device 300 transmits the access request to the second network control device 140 (415 and 416). In other words, the access request is transmitted to the access destination related to the access destination setting information 171.

When the access request is received (416), the second network control device 140 performs the access process with the wireless terminal device 300 (417 and 418). Through the access process, the wireless terminal device 300 can perform communication with the second network control device 140. Thus, the wireless terminal device 300 can transmit the second content 160 from the information processing device 200 through the second network control device 140.

Then, the second network control device 140 transmits the access request transmitted from the wireless terminal device 300 to the information processing device 200 (419 and 420). When the access request is received by the information processing device 200 (420), the information processing device 200 transmits the second content 160 through the second network control device 140, and the wireless terminal device 300 receives the second content 160 (421 to 424). In other words, the second content 160 is transmitted to the wireless terminal device 300 using the wireless access network of the second communication service provider 130.

Further, when the transmission process of the second content 160 from the information processing device 200 to the wireless terminal device 300 ends (425), USIM information restoration instruction information is transmitted (426 to 429). In other words, when downloading of the second content 160 is completed (425), the USIM information restoration instruction information is transmitted from the information processing device 200 to the wireless terminal device 300 through the second network control device 140 (426 to 429). The USIM information restoration instruction information includes information (restoration information) used to renew the USIM information (the second communication service provider 130) stored in the USIM information storage unit 370 of the wireless terminal device 300 to the USIM information related to the first communication service provider 110.

Further, when the wireless terminal device 300 receives the USIM information restoration instruction information (429), the USIM information renewal unit 360 of the wireless terminal device 300 renews the USIM information stored in the USIM information storage unit 370 based on the USIM information restoration instruction information (430). In other words, the USIM information related to the second communication service provider 130 is renewed to the USIM information related to the first communication service provider 110. Through the restoration process, the wireless terminal device 300 can have access to the first communication service provider 110 (the first network control device 120).

[Example Operation of Wireless Terminal Device]

Next, an operation of the wireless terminal device 300 according to the first embodiment of the present invention will be described with reference to the accompanying drawings.

Figure 10:
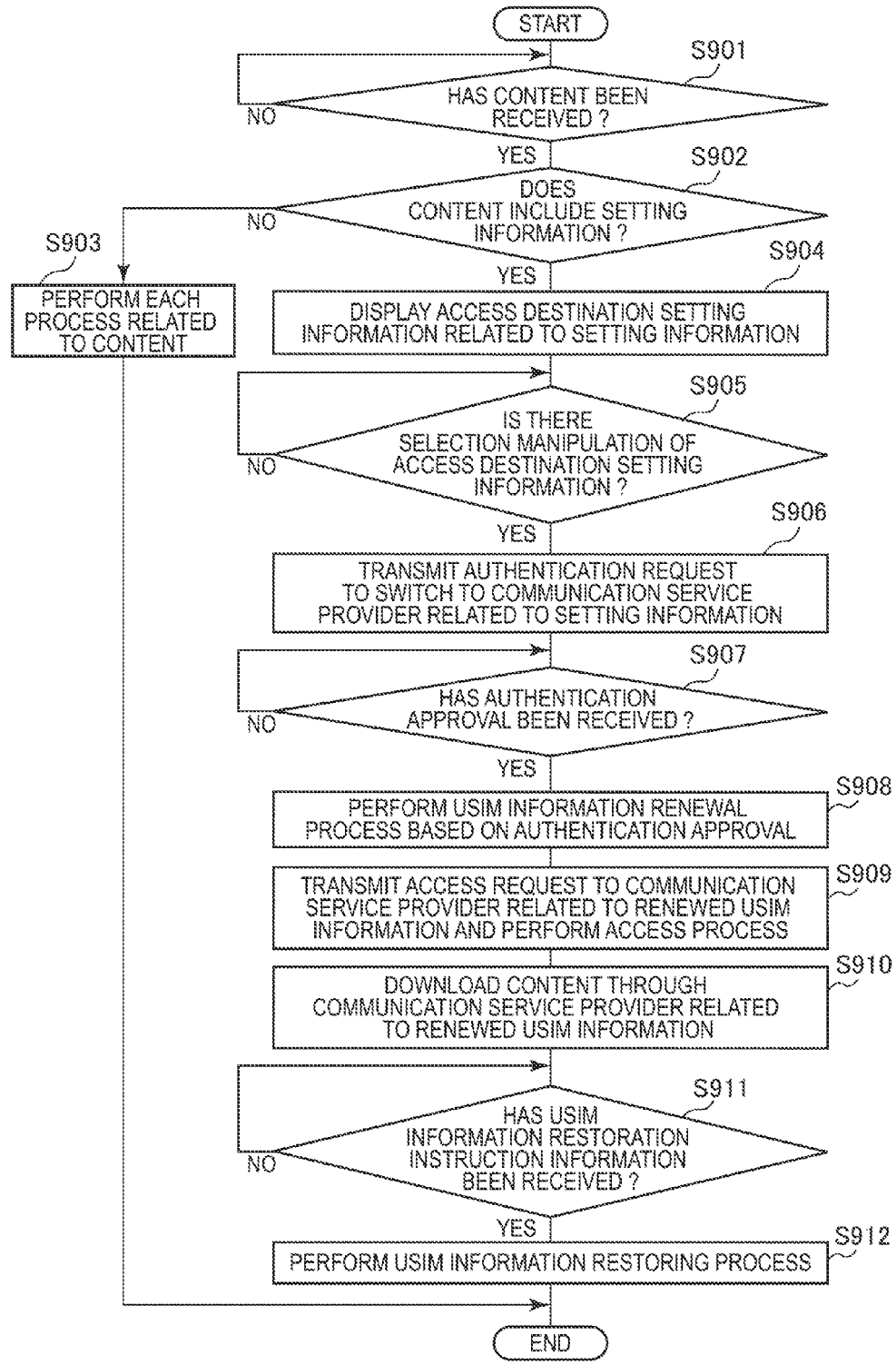
FIG. 10 is a flowchart illustrating an example of a procedure of a content reception control process performed by the wireless terminal device 300 according to the first embodiment of the present invention.

FIG. 10 is a flowchart illustrating an example of a procedure of a content reception control process performed by the wireless terminal device 300 according to the first embodiment of the present invention. In this example, an example in which the authentication request is transmitted by the user's manual manipulation is illustrated.

First, it is determined whether or not content has been received (step S901), and when no content has been received, monitoring is continuously performed. When content has been received (step S901), the control unit 330 determines whether or not the content includes setting information (step S902). When the content does not includes setting information (i.e., in the case of normal content) (step S902), each process (e.g., a download process) related to the content is performed (step S903).

When the content includes setting information (i.e., in the case of the first content) (step S902), the control unit 330 causes access destination setting information related to the setting information to be displayed on the display unit 350 (step S904). In this case, the distribution information is displayed on the display unit 350 together with the access destination setting information.

Then, it is determined whether or not the selection manipulation of the access destination setting information has been made (step S905), and when the selection manipulation of the access destination setting information has not been made, monitoring is continuously performed. Meanwhile, when the selection manipulation of the access destination setting information has been made (step S905), access to the access destination related to the access destination setting information is activated. In other words, the control unit 330 transmits the authentication request to access the access destination related to the access destination setting information to the information processing device 200 through the first network control device 120 (step S906).

Then, it is determined whether or not the authentication approval representing that the wireless terminal device 300 has been authenticated by the authentication process on the authentication request has been received (step S907), and when the authentication approval has not been received, monitoring is continuously performed. When the authentication approval has been received (step S907), the USIM information renewal unit 360 renews the USIM information stored in the USIM information storage unit 370 based on the authentication approval (step S908).

Then, the control unit 330 transmits the access request to the communication service provider (network control device) related to the renewed USIM information, and the access process is performed between the network control device and the wireless terminal device 300 (step S909). In other words, the access request is transmitted to the access destination related to the access destination setting information 171, and the access process is performed.

Then, the communication unit 310 receives the second content through the access destination (the network control device 140) related to the access destination setting information 171 (step S910). In other words, the second content is downloaded through the communication service provider related to the renewed USIM information.

Then, it is determined whether or not the USIM information restoration instruction information representing that the transmission process of the second content has ended has been received (step S911), and when the USIM information restoration instruction information has not been received, monitoring is continuously performed. When the USIM information restoration instruction information has been received (step S911), the USIM information renewal unit 360 renews the USIM information stored in the USIM information storage unit 370 based on the USIM information restoration instruction information (step S912). In other words, the restoration process of the USIM information is performed.

Figure 11:
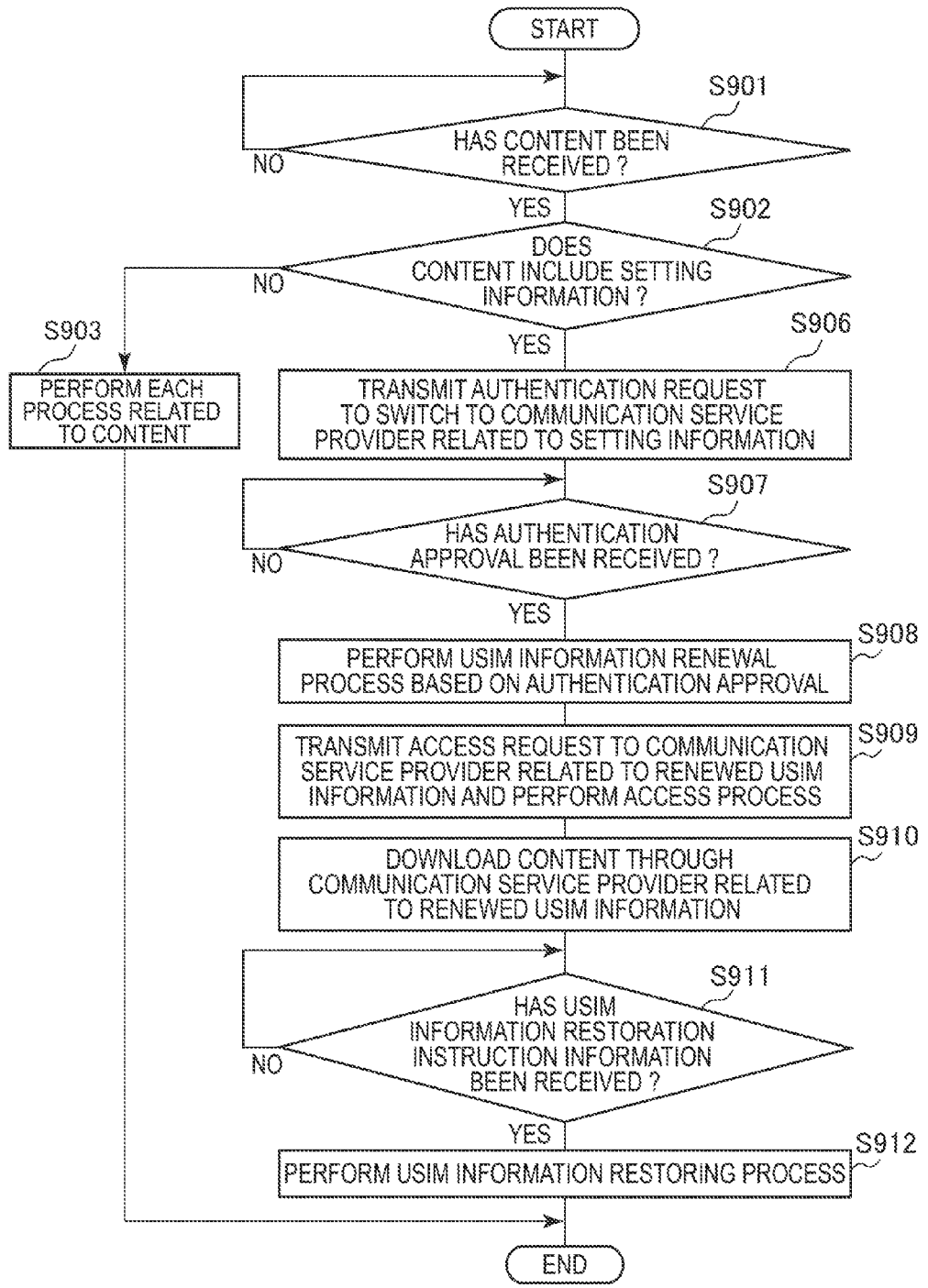
FIG. 11 is a flowchart illustrating an example of a procedure of a content reception control process performed by the wireless terminal device 300 according to the first embodiment of the present invention.

FIG. 11 is a flowchart illustrating an example of a procedure of the content reception control process performed by the wireless terminal device 300 according to the first embodiment of the present invention. In this example, the authentication request is automatically transmitted. Since this procedure is a modified example of FIG. 10, steps that are the same as in FIG. 10 are denoted by the same reference numerals and a description thereof will be omitted.

When the received content includes setting information (i.e., in the case of the first content) (step S902), access to the access destination related to the access destination setting information is activated. In other words, the control unit 330 transmits the authentication request to access the access destination related to the access destination setting information to the information processing device 200 through the first network control device 120 (step S906).

[Example Operation of Information Processing Device]

Next, an operation of the information processing device 200 according to the first embodiment of the present invention will be described with reference to the accompanying drawings.

Figure 12:
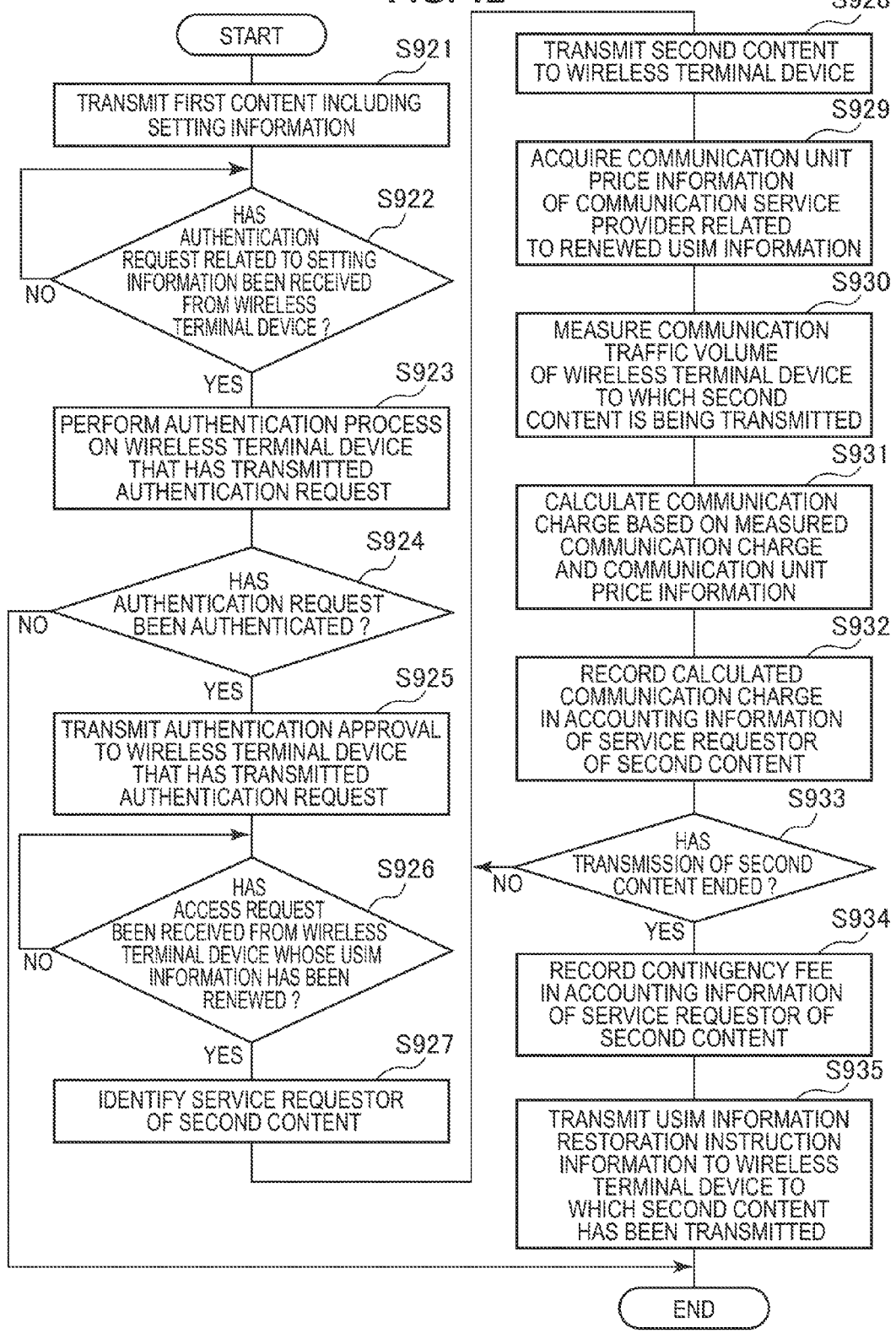
FIG. 12 is a flowchart illustrating an example of a procedure of a content provision control process performed by the information processing device 200 according to the first embodiment of the present invention.

FIG. 12 is a flowchart illustrating an example of a procedure of a content provision control process performed by the information processing device 200 according to the first embodiment of the present invention.

First, the service providing unit 220 transmits the first content including the setting information to each wireless terminal device through the communication unit 210 (step S921). Then, it is determined whether or not the authentication request related to the setting information has been received from the wireless terminal device to which the first content has been transmitted (step S922). When the authentication request related to the setting information has not been received, monitoring is continuously performed.

When the authentication request related to the setting information has been received (step S922), the USIM information renewal control unit 230 performs the authentication process on the wireless terminal device that has transmitted the authentication request (step S923). Then, it is determined whether the wireless terminal device that has transmitted the authentication request has been authenticated through the authentication process (step S924), and when the wireless terminal device that has transmitted the authentication request has not been authenticated, the operation of the content provision control process ends.

When the wireless terminal device that has transmitted the authentication request has been authenticated (step S924), the USIM information renewal control unit 230 transmits the authentication approval representing that the authentication has been approved to the wireless terminal device that has transmitted the authentication request (step S925). In this case, the authentication approval is transmitted through the network control device related to the USIM information held in the wireless terminal device that has transmitted the authentication request. Here, steps S921 to S925 are an example of the setting process set forth in the accompanying claims.

Then, it is determined whether or not the access request has been transmitted from the wireless terminal device whose USIM information has been renewed (step S926). In other words, the access process is performed between the wireless terminal device to which the authentication approval has been transmitted and the communication service provider (the network control device) related to the setting information, and through the access process, communication can be performed between the wireless terminal device to which the authentication approval has been transmitted and the communication service provider (the network control device) related to the setting information. Thus, the access request from the wireless terminal device whose USIM information has been renewed is received through the communication service provider (the network control device) related to the setting information. Further, when the access request has not been transmitted from the wireless terminal device whose USIM information has been renewed (step S926), monitoring is continuously performed.

Further, when the access request has been transmitted from the wireless terminal device whose USIM information has been renewed (step S926), the service requestor of the second content related to the access request is identified (step S927). In other words, the accounting processing unit 250 identifies the service requestor of the second content related to the access request based on the service provider identification information included in the setting information related to the access request.

Then, the service providing unit 220 transmits the second content to the wireless terminal device that has transmitted the access request through the communication unit 210 (step S928). In other words, the second content is transmitted to the wireless terminal device using the wireless access network of the communication service provider related to the setting information. Here, step S928 is an example of a service providing process set forth in the accompanying claims.

Then, the accounting processing unit 250 acquires communication unit price information of the communication service provider related to the USIM information (the renewed USIM information) in the wireless terminal device to which the second content is being transmitted (step S929).

Then, the accounting processing unit 250 measures communication traffic volume of the wireless terminal device that is transmitting the second content based on information from the communication unit 210 (information from the network control device) (step S930). Then, the accounting processing unit 250 calculates a communication charge based on the measured communication traffic volume and the acquired communication unit price information (step S931).

Then, the accounting processing unit 250 records the calculated communication charge in the accounting information of the service requestor of the second content (step S932). In other words, the communication charge is recorded as the history information of the accounting information holding unit 260, and the communication charge is added to the total amount of the communication charge 266. Here, steps S929 to S932 are an example of an accounting process set forth in the accompanying claims.

Then, it is determined whether or not the transmission process of the second content to the wireless terminal device has ended (step S933), and when the transmission process of the second content to the wireless terminal device has not ended, the process returns to step S928. However, when the transmission process of the second content to the wireless terminal device has ended (step S933), the accounting processing unit 250 records a contingency fee related to the transmission of the second content in the accounting information of the service requestor of the second content (step S934). In other words, the contingency fee is recorded in the contingency fee 267 of the accounting information holding unit 260.

Then, the USIM information renewal control unit 230 transmits the USIM information restoration instruction information to the wireless terminal device that has finished the transmission process of the second content (step S935). Here, step S935 is an example of a restoring process set forth in the accompanying claims.

As described above, content can be distributed using a communication service provider designated by a content distributor regardless of a communication service provider with which the user has a contract. In other words, after secure authentication is performed with a previously contracted communication service provider, USIM information related to the communication service provider can be renewed, and thus it is possible to temporarily contract with any communication service provider designated by a content distributor. Further, since the content distributor bears a communication charge incurred when the user browses the distributed content, the user can browse the content for free. Further, as a distribution condition is individually set to a content distributor, more flexible content distribution can be performed. Further, it is possible to divide a communication charge incurred when browsing distributed content and bill each service requestor.

[Example Display of Web Information]

The above description concerns the example in which the first content including the setting information is first transmitted, and then the second content is transmitted using the setting information. When content distribution is performed as described above, first access is activated by the service providing company 201, but when access is made from a web page, first access is activated by the user. In this regard, in this example, a content transmission example when access is made from a web page will be described.

Figure 13A:
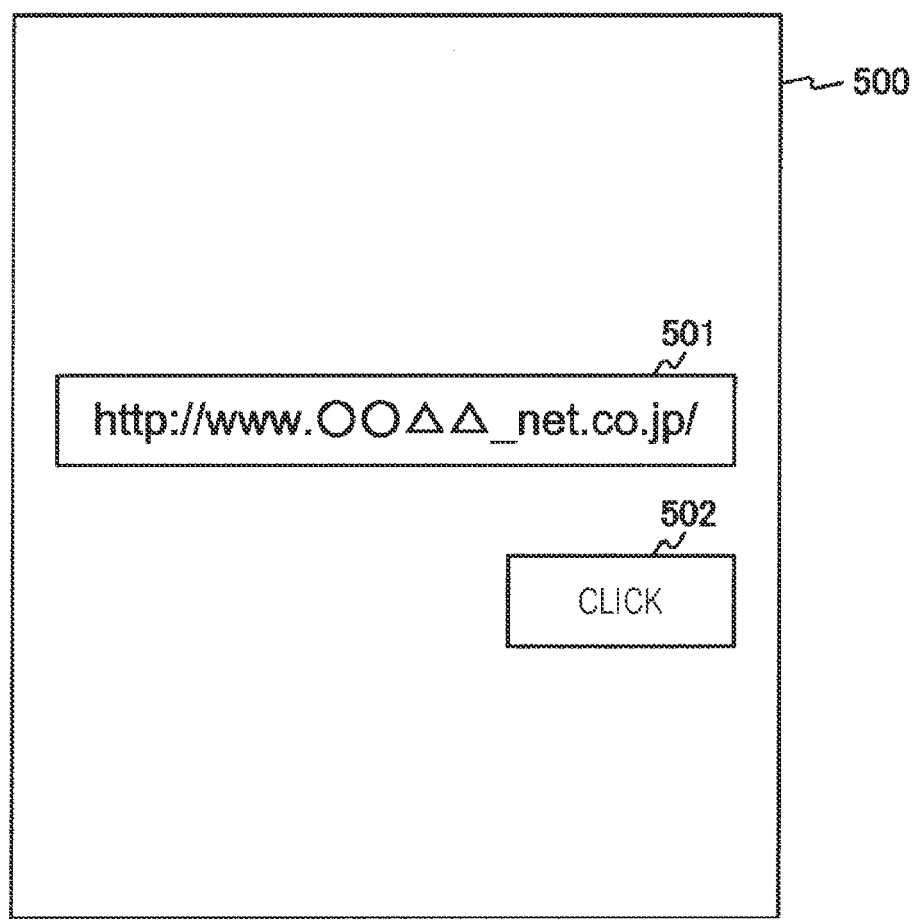
FIG. 13A is a diagram illustrating a display example of web information displayed on the wireless terminal device 300 according to the first embodiment of the present invention.
Figure 13B:
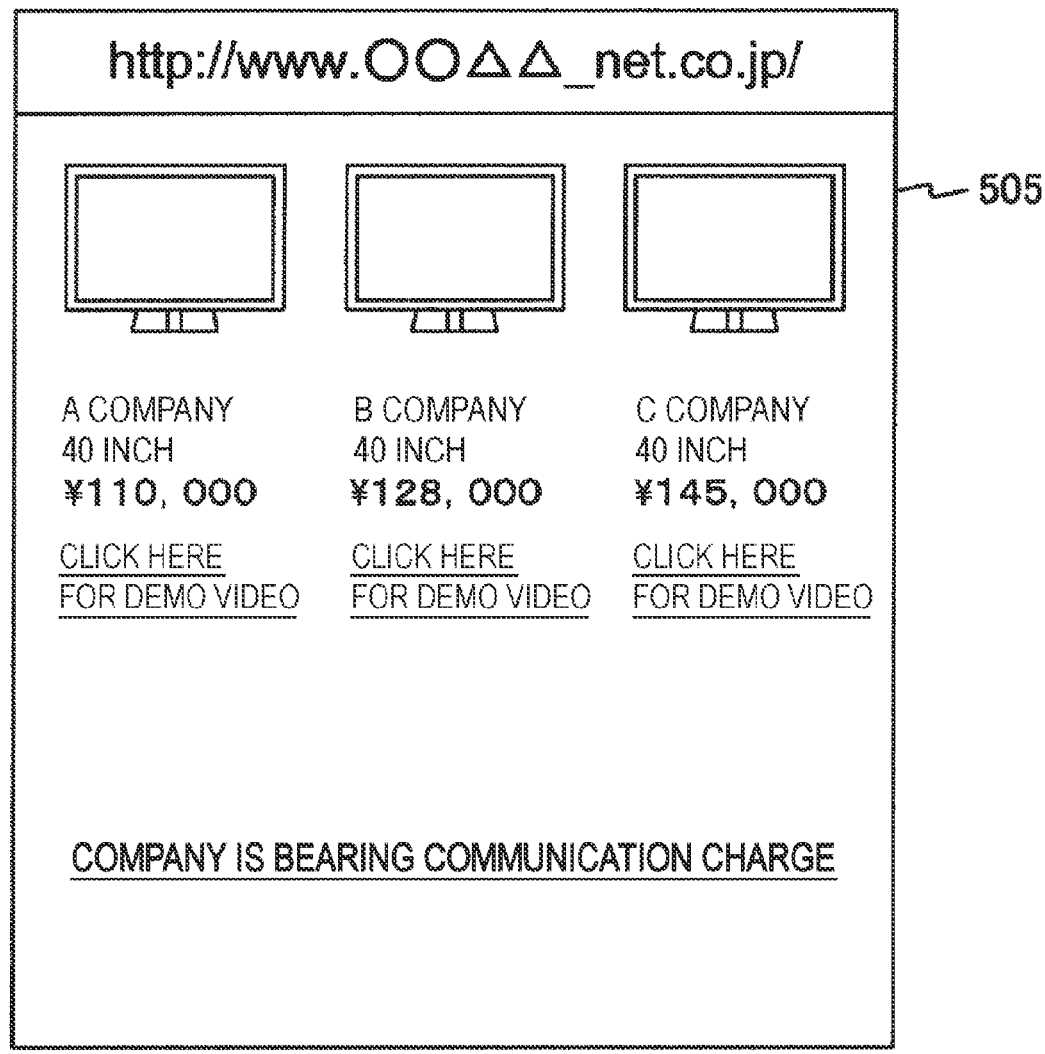
FIG. 13B is a diagram illustrating a display example of web information displayed on the wireless terminal device 300 according to the first embodiment of the present invention.
Figure 14:
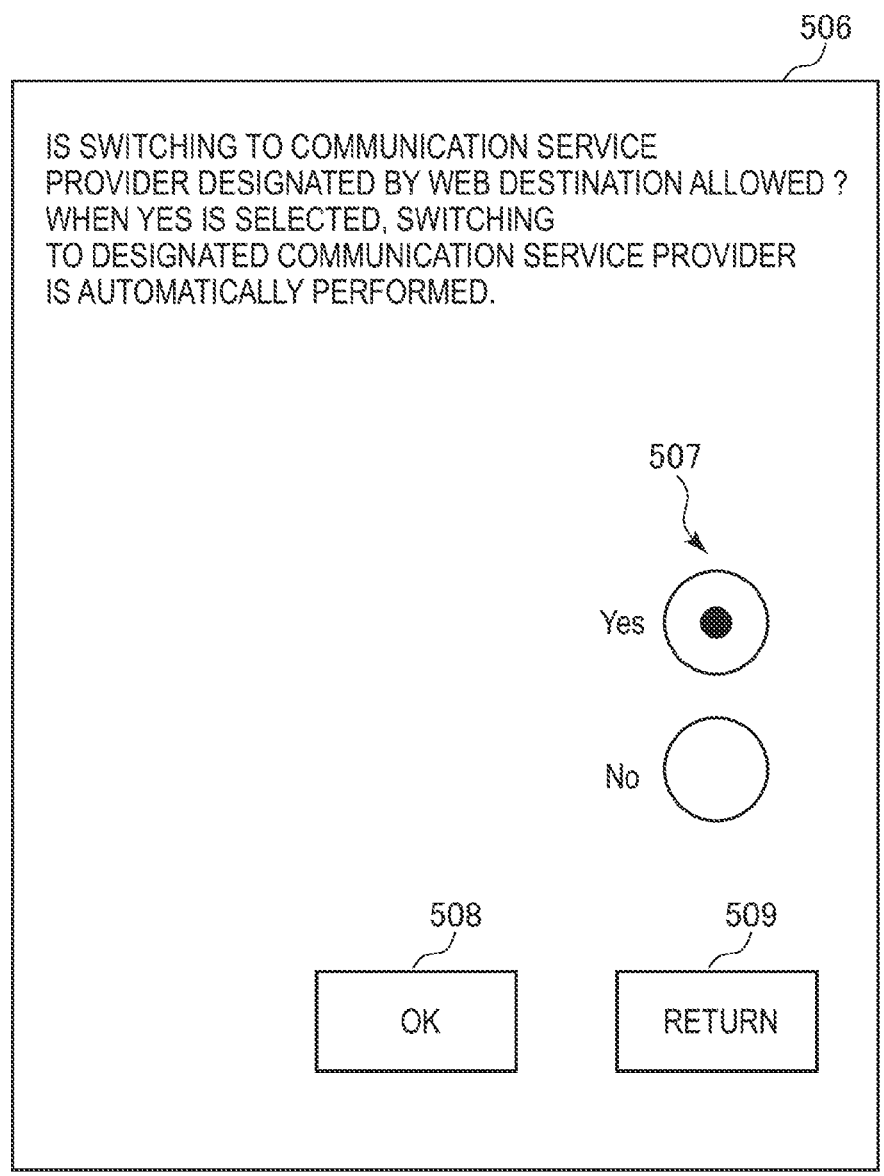
FIG. 14 is a diagram illustrating a display example of web information displayed on the wireless terminal device 300 according to the first embodiment of the present invention.

FIGS. 13A, 13B and 14 are diagrams illustrating an example of web information displayed on the wireless terminal device 300 according to the first embodiment of the present invention.

FIG. 13A illustrates a display example (a display screen 500) of an URL (Uniform Resource Locator) input screen displayed using a browser. For example, when the user inputs a desired URL to an input box 501 in the display screen 500 and performs a push manipulation of pushing the click button 502 down, a desired web page can be accessed.

FIG. 13B illustrates a display example (a display screen 505) displayed after the push manipulation of pushing the click button 502 down is performed in the display screen 500 illustrated in FIG. 13B. The display screen 505 is substantially the same as the display screen 180 illustrated in FIG. 3B.

FIG. 14 illustrates a display example (a display screen 506) of a setting screen used to set whether or not switching to a communication service provider designated by a web destination is allowed. A radio button 507, an OK button 508, and a return button 509 are displayed on the display screen 506.

For example, when switching to a communication service provider designated by a web destination is allowed, the radio button 507 of Yes is selected, and the OK button 508 is pushed down. Thus, for example, the display screen 505 illustrated in FIG. 13B is provided through the communication service provider designated by the web destination. However, when switching to a communication service provider designated by a web destination is not allowed, the radio button 507 of No is selected, and the OK button 508 is pushed down. In this case, for example, the display screen 505 illustrated in FIG. 13B is provided through a previously contracted communication service provider.

[Example Configuration of Web Information]

Figure 15A:
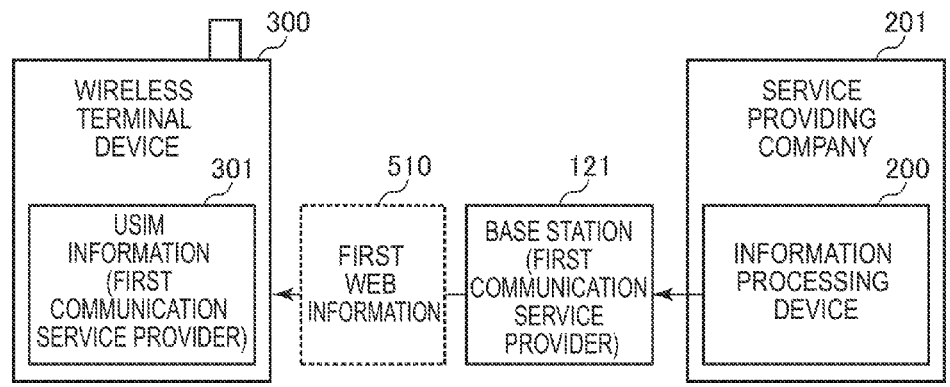
FIG. 15A is a diagram illustrating an example configuration of first web information transmitted from the information processing device 200 according to the first embodiment of the present invention.
Figure 15B:
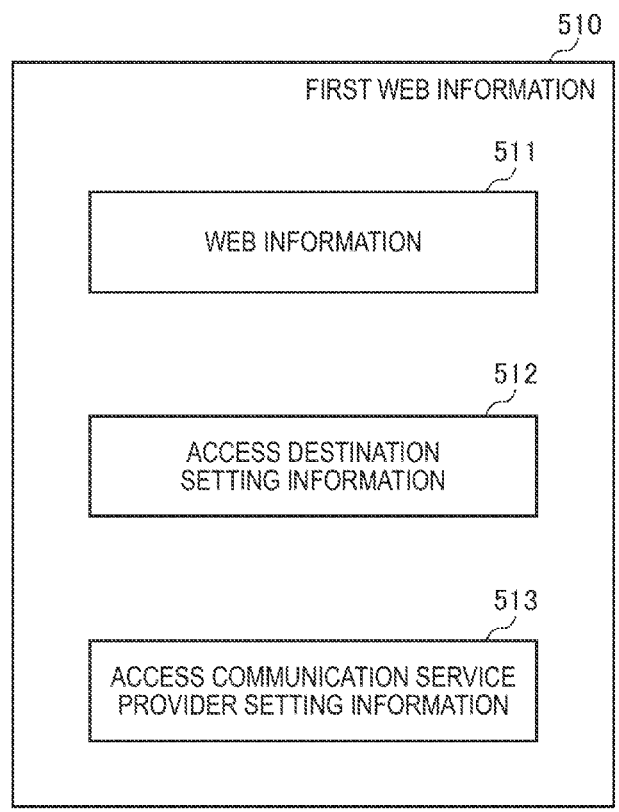
FIG. 15B is a diagram illustrating an example configuration of the first web information transmitted from the information processing device 200 according to the first embodiment of the present invention.

FIGS. 15A and 15B are diagrams illustrating an example configuration of first web information transmitted from the information processing device 200 according to the first embodiment of the present invention. FIGS. 15A to 21 will be described under the assumption that the information processing device 200 is a web server providing web information.

FIG. 15A illustrates an example in which the wireless terminal device 300 receives first web information 510 from the information processing device 200 through the base station 121. Further, FIG. 15A is similar to FIG. 4A except that the first web information 510 is transmitted instead of the first content 150.

FIG. 15B schematically illustrates pieces of information configuring the first web information 510. The first web information 510 includes web information 511, access destination setting information 512, and access communication service provider setting information 513. The pieces of information included in the first web information 510 correspond to the pieces of information included in the first content 150 illustrated in FIG. 4B, and thus they will not be described in detail again here.

The web information 511 is information to be initially checked on the user's access to a web page, and is preferably information (e.g., text information) having a relatively small capacity.

[Example Communication Between Devices]

Figure 16:
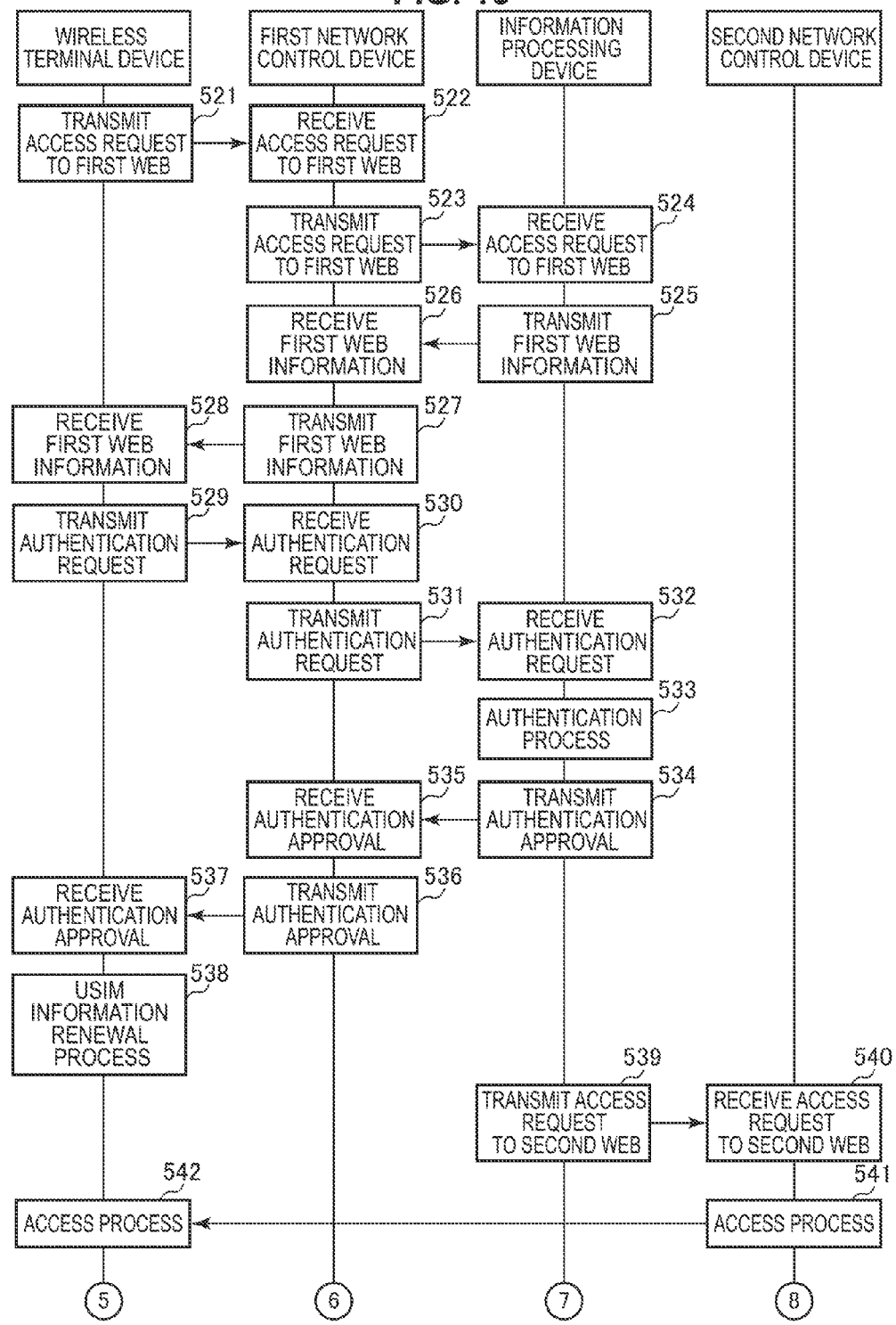
FIG. 16 is a sequence chart illustrating an example communication process between devices configuring the communication system 100 according to the first embodiment of the present invention.
Figure 17:
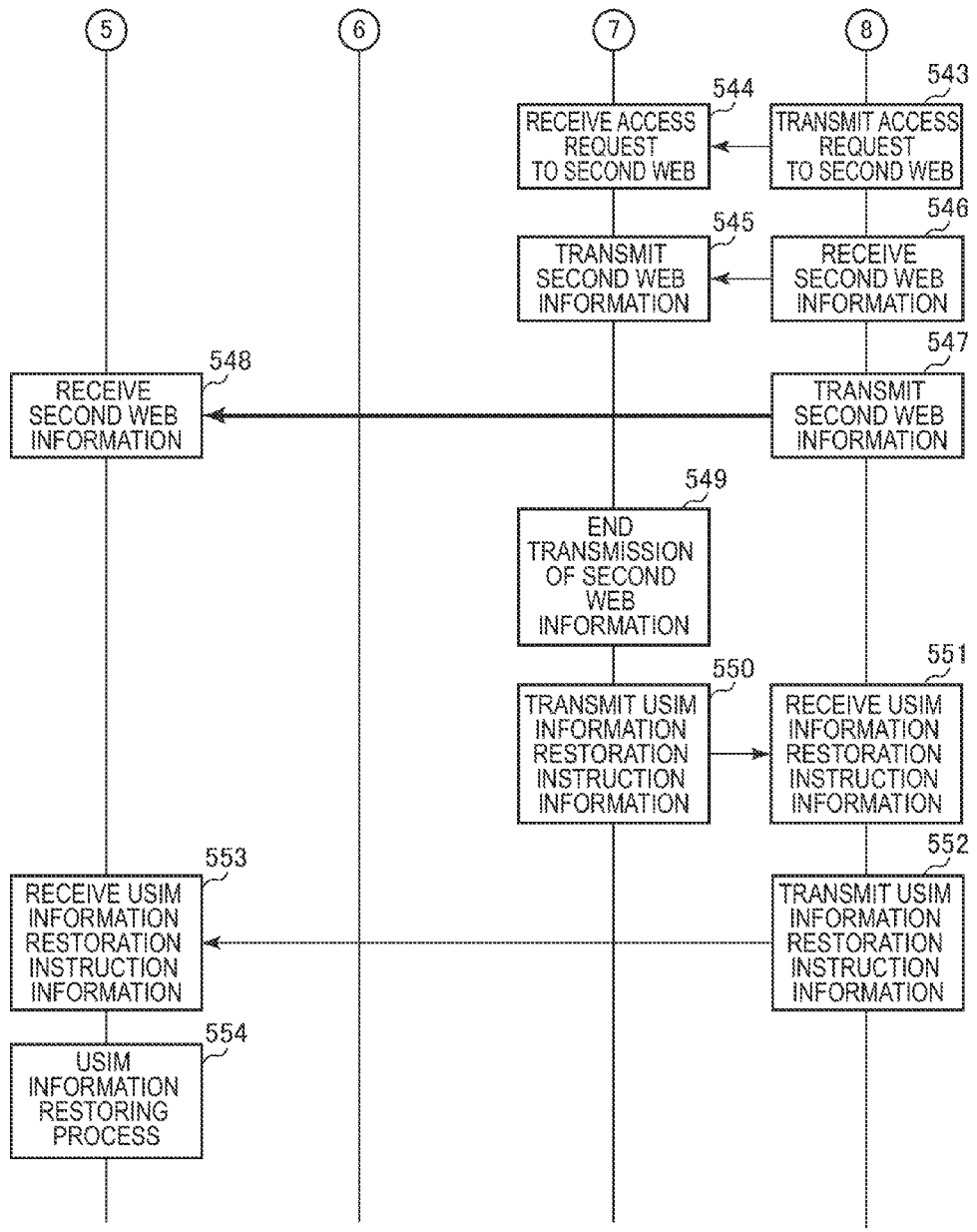
FIG. 17 is a sequence chart illustrating an example communication process between devices configuring the communication system 100 according to the first embodiment of the present invention.

FIGS. 16 and 17 are sequence charts illustrating an example communication process between devices configuring the communication system 100 according to the first embodiment of the present invention. Since FIGS. 16 and 17 are a modified example of FIGS. 8 and 9, steps common (steps corresponding) to FIGS. 8 and 9 are denoted by the same reference numerals and a description thereof is partially omitted.

First, an access request to a first web by a user manipulation is transmitted from the wireless terminal device 300 to the information processing device 200 through the first network control device 120 (521 to 524). In response to the access request, the first web information is transmitted from the information processing device 200 to the wireless terminal device 300 through the first network control device 120 (525 to 528).

The process of 529 to 538 illustrated in FIG. 16 corresponds to the process of 405 to 414 illustrated in FIG. 8.

Further, the information processing device 200 transmits an access request to a second web corresponding to the first web information to the second network control device 140 (539 and 540). In other words, after the USIM information is renewed, the access request to the second web corresponding to the first web information is transferred from the server side to the second network control device 140.

When the access request is received (540), the second network control device 140 performs the access process with the wireless terminal device 300 (541 and 542).

Then, the second network control device 140 transmits the access request to the second web transmitted from the wireless terminal device 300 to the information processing device 200 (543 and 544). When the access request to the second web is received by the information processing device 200 (544), the information processing device 200 transmits second web information through the second network control device 140, and the wireless terminal device 300 receives the second web information (545 to 548).

Further, when the transmission process of the second web information from the information processing device 200 to the wireless terminal device 300 ends (549), the USIM information restoration instruction information is transmitted (550 to 553). Then, when the wireless terminal device 300 receives the USIM information restoration instruction information (553), the USIM information renewal unit 360 of the wireless terminal device 300 renews the USIM information stored in the USIM information storage unit 370 based on the USIM information restoration instruction information (554).

[Example Operation of Wireless Terminal Device]

Next, an operation of the wireless terminal device 300 according to the first embodiment of the present invention will be described with reference to the accompanying drawings.

Figure 18:
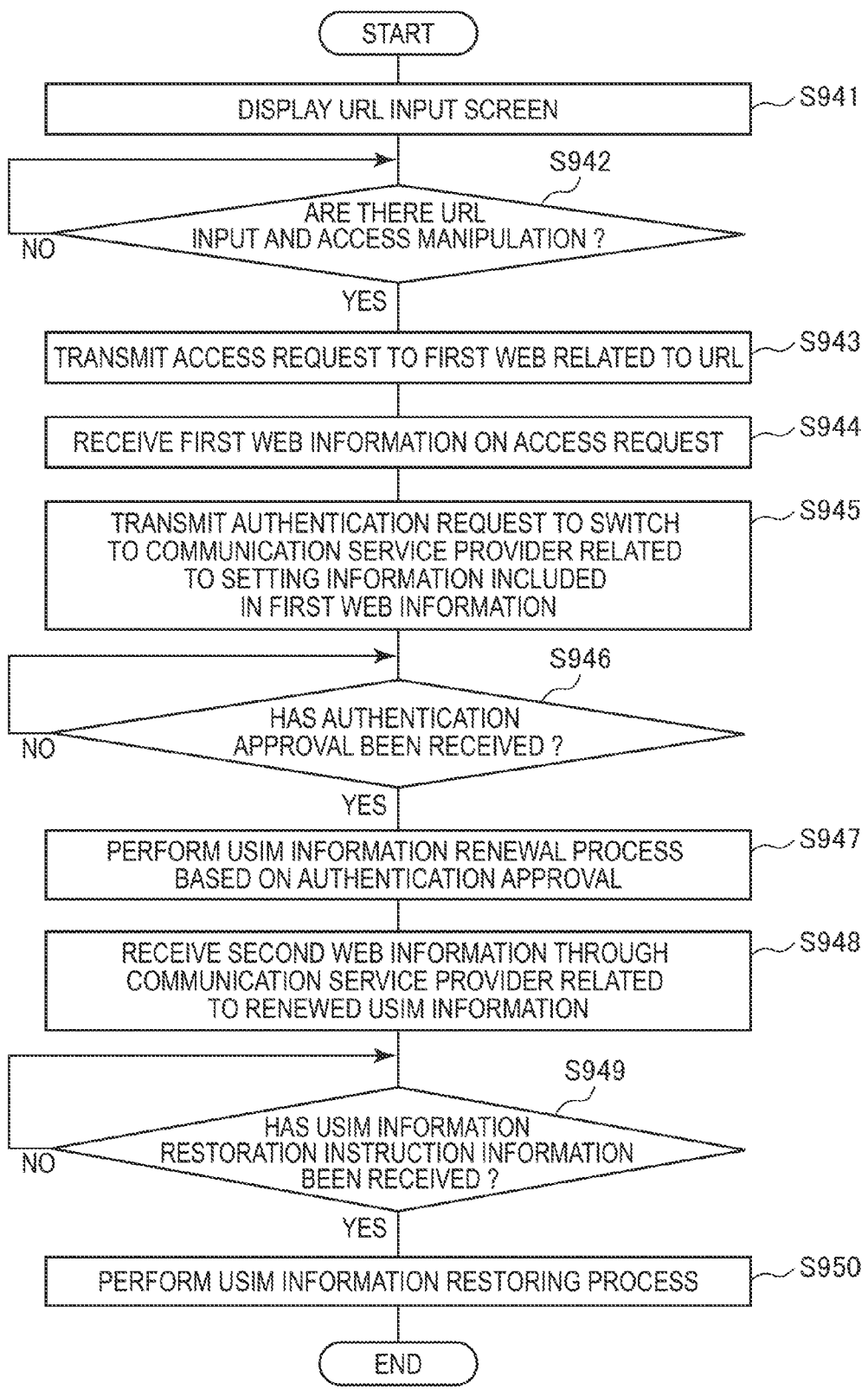
FIG. 18 is a flowchart illustrating an example of a procedure of a web information reception control process performed by the wireless terminal device 300 according to the first embodiment of the present invention.

FIG. 18 is a flowchart illustrating an example of a procedure of a web information reception control process performed by the wireless terminal device 300 according to the first embodiment of the present invention.

First, a URL input screen is displayed on the display unit 350 (step S941). Then, it is determined whether or not a desired URL has been input on the URL input screen and then an access manipulation has been performed (step S942), and when neither an input of a desired URL nor an access manipulation has been performed, monitoring is continuously performed.

When a desired URL has been input on the URL input screen and then an access manipulation has been performed (step S942), the control unit 330 transmits the access request to the first web related to the corresponding URL to the information processing device 200 (step S943). Then, the first web information is received in response to the access request (step S944). Then, the control unit 330 transmits an authentication request to access an access destination of the access destination setting information related to the setting information included in the received first web information to the information processing device 200 (step S945).

Then, it is determined whether or not an authentication approval representing that the wireless terminal device 300 has been authenticated by the authentication process on the authentication request has been received (step S946), and when the authentication approval has not been received, monitoring is continuously performed. When the authentication approval has been received (step S946), the USIM information renewal unit 360 renews the USIM information stored in the USIM information storage unit 370 based on the authentication approval (step S947).

Then, the communication unit 310 receives the second web information (the network control device) through the access destination related to the access destination setting information 171 (step S948). In other words, the second web information is transmitted through the communication service provider related to the renewed USIM information.

Then, it is determined whether or not the USIM information restoration instruction information representing that the transmission process of the second web information has ended has been received (step S949), and when the USIM information restoration instruction information has not been received, monitoring is continuously performed. When the USIM information restoration instruction information has been received (step S949), the USIM information renewal unit 360 renews the USIM information stored in the USIM information storage unit 370 based on the USIM information restoration instruction information (step S950). In other words, the restoration process of the USIM information is performed.

[Example Operation of Information Processing Device]

Next, an operation of the information processing device 200 according to the first embodiment of the present invention will be described with reference to the accompanying drawings.

Figure 19:
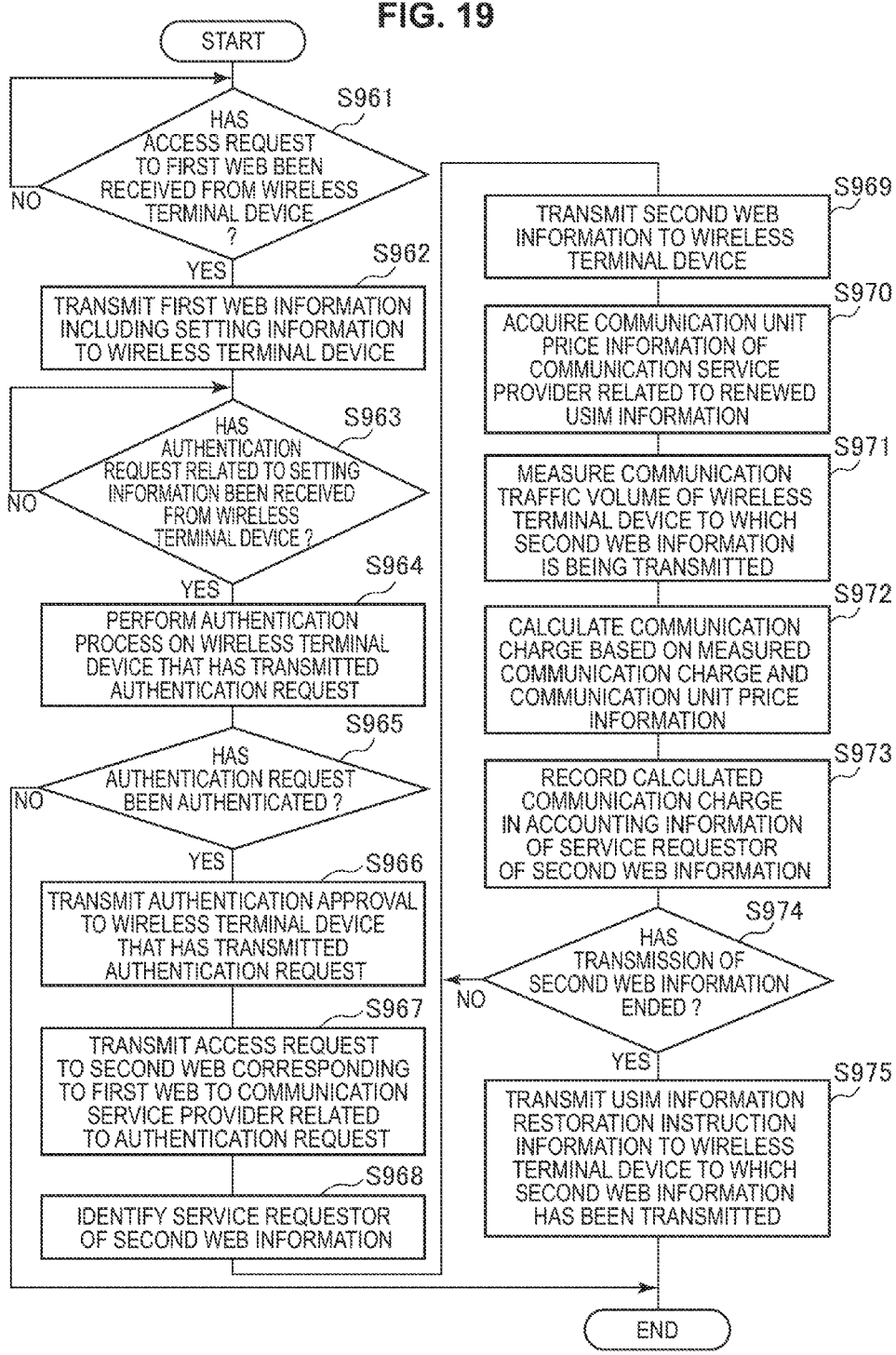
FIG. 19 is a flowchart illustrating an example of a procedure of a web information provision control process performed by the information processing device 200 according to the first embodiment of the present invention.

FIG. 19 is a flowchart illustrating an example of a procedure of a web information provision control process of the information processing device 200 according to the first embodiment of the present invention.

First, it is determined whether or not the access request to the first web has been received from the wireless terminal device (step S961), and when the access request has not been received, monitoring is continuously performed. However, when the access request to the first web has been received from the wireless terminal device (step S961), the service providing unit 220 transmits the first web information including the setting information to each wireless terminal device through the communication unit 210 (step S962). Then, it is determined whether or not the authentication request related to the setting information has been received from the wireless terminal device to which the first web information has been transmitted (step S963). When the authentication request related to the setting information has not been received, monitoring is continuously performed.

When the authentication request related to the setting information has been received (step S963), the USIM information renewal control unit 230 performs the authentication process on the wireless terminal device that has transmitted the authentication request (step S964). Then, it is determined whether or not the wireless terminal device that has transmitted the authentication request has been authenticated through the authentication process (step S965), and when the wireless terminal device that has transmitted the authentication request has not been authenticated, an operation of the web information provision control process ends.

When the wireless terminal device that has transmitted the authentication request has been authenticated (step S965), the USIM information renewal control unit 230 transmits the authentication approval representing that the authentication has been approved to the wireless terminal device that has transmitted the authentication request (step S966).

Then, the communication unit 210 transmits the access request to the second web corresponding to the first web information (the access request) to the communication service provider related to the authentication request (step S967), and the service requestor of the second web information is identified (step S968). In other words, the accounting processing unit 250 identifies the service requestor of the second web information based on the service provider identification information included in the setting information related to the authentication request.

Then, the service providing unit 220 transmits the second web information to the wireless terminal device that has transmitted the authentication request through the communication unit 210 (step S969). In other words, the second web information is transmitted to the wireless terminal device using the wireless access network of the communication service provider related to the setting information.

Then, the accounting processing unit 250 acquires communication unit price information of the communication service provider related to the USIM information (the renewed USIM information) in the wireless terminal device to which the second web is being transmitted (step S970).

Then, the accounting processing unit 250 measures communication traffic volume of the wireless terminal device that is transmitting the second web information based on information from the communication unit 210 (information from the network control device) (step S971). Then, the accounting processing unit 250 calculates a communication charge based on the measured communication traffic volume and the acquired communication unit price information (step S972).

Then, the accounting processing unit 250 records the calculated communication charge in the accounting information of the service requestor of the second web information (step S973). In other words, the communication charge is recorded as the history information of the accounting information holding unit 260, and the communication charge is added to the total amount of the communication charge 266.

Then, it is determined whether or not the transmission process of the second web to the wireless terminal device has ended (step S974), and when the transmission process of the second web to the wireless terminal device has not ended, the process returns to step S969. However, when the transmission process of the second web to the wireless terminal device has ended (step S974), the USIM information renewal control unit 230 transmits the USIM information restoration instruction information to the wireless terminal device on which the transmission process of the second web information has ended (step S975).

[Example Accounting According to Presence or Absence of Product Purchase by User]

The above description concerns the example in which the service requestor of the second web information bears a communication charge of all users who browse the second web information. Here, for example, for a service provider selling a product or the like through a web page, it is assumed to be desirable to bear a communication charge only of a user who purchases the product. In this regard, in the following, an example of imposing a communication charge according to whether there is a product purchase by the user will be described.

Figure 20:
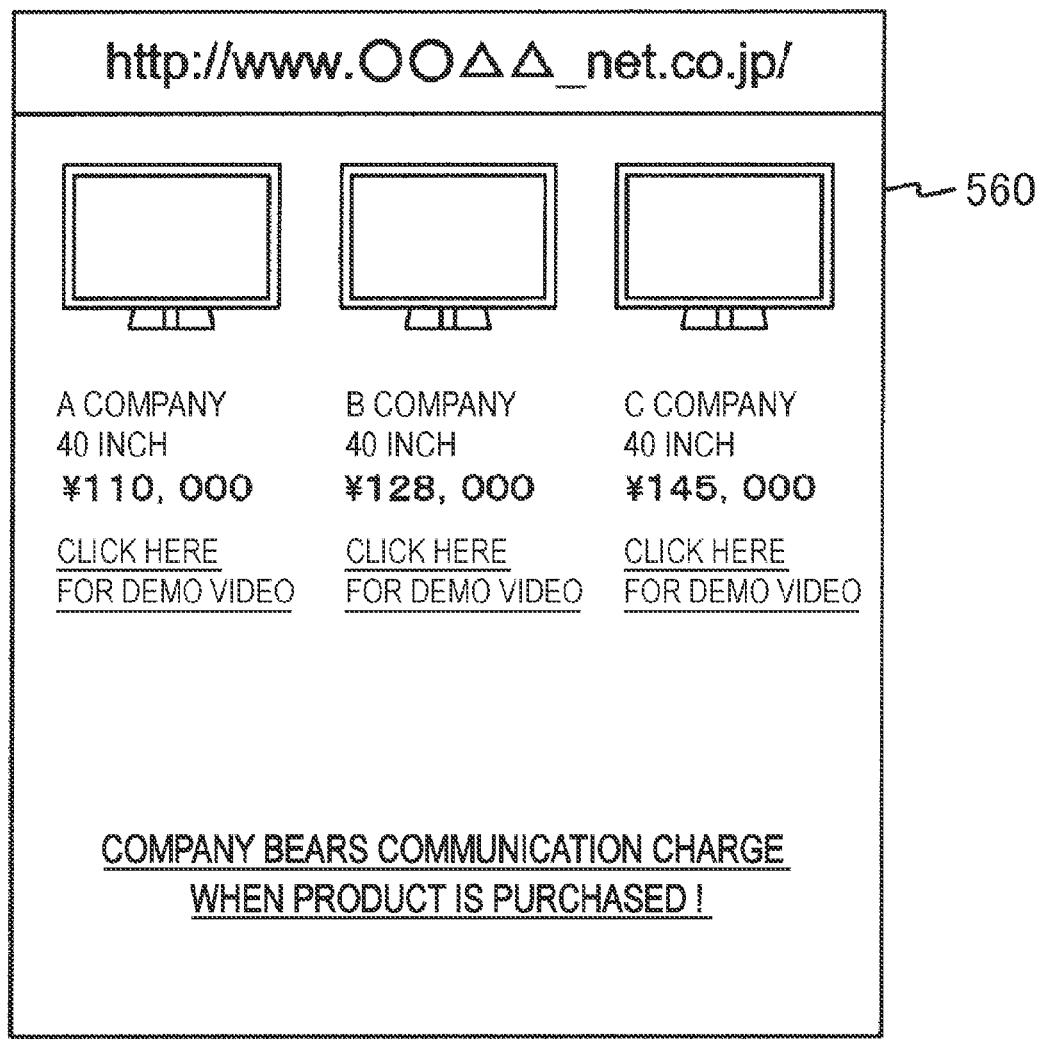
FIG. 20 is a diagram illustrating a display example of web information displayed on the wireless terminal device 300 according to the first embodiment of the present invention.

FIG. 20 is a diagram illustrating an example of web information displayed on the wireless terminal device 300 according to the first embodiment of the present invention.

A display screen 560 illustrated in FIG. 20 is an example displayed after a push manipulation of pushing the click button 502 is pushed down in the display screen 500 illustrated in FIG. 13A. As described above, information representing that a service provider bears a communication charge only when a product is purchased is displayed on the display screen 560.

Figure 21:
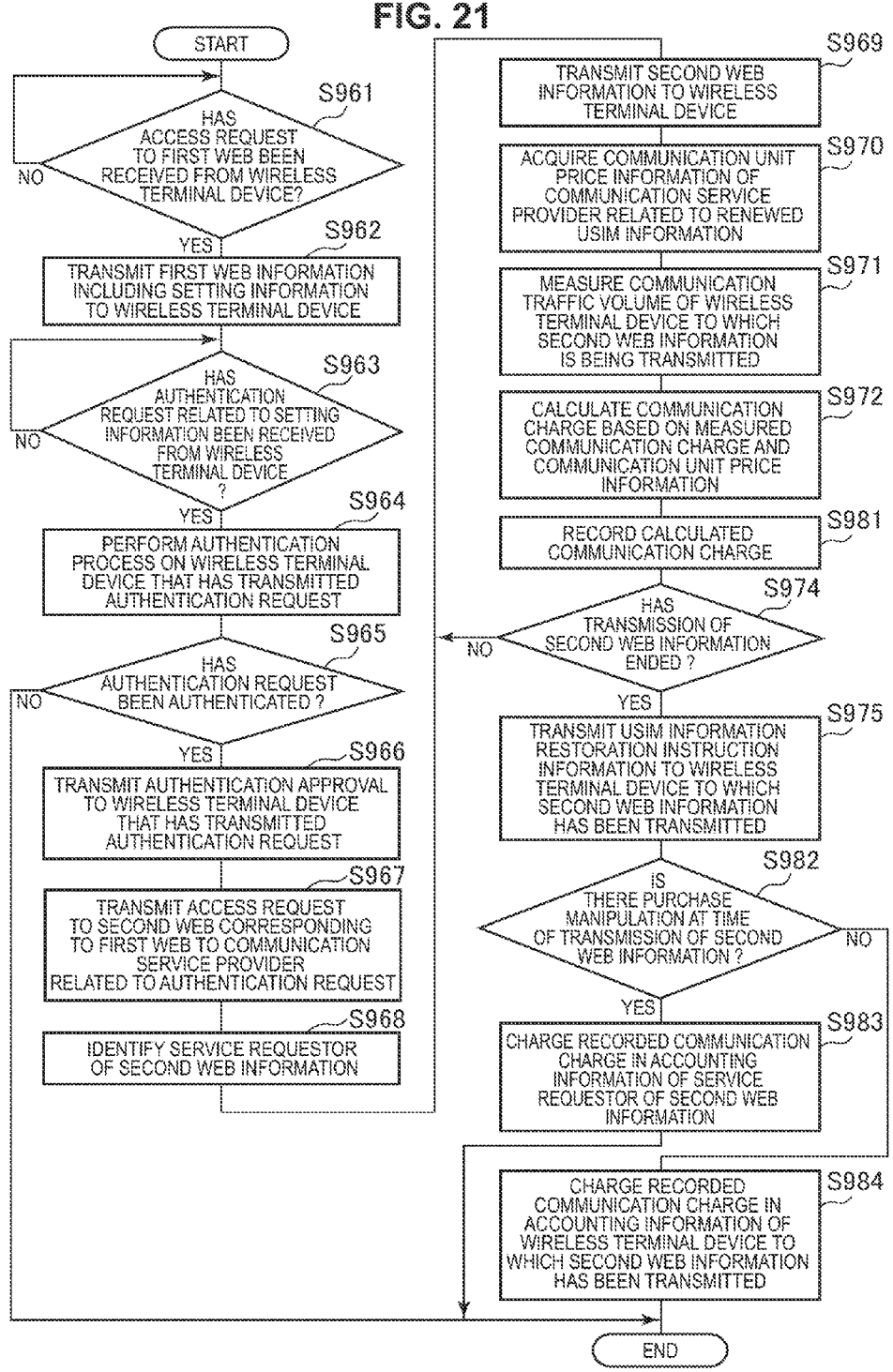
FIG. 21 is a flowchart illustrating an example of a procedure of a web information provision control process performed by the information processing device 200 according to the first embodiment of the present invention.

FIG. 21 is a flowchart illustrating an example of a web information provision control process performed by the information processing device 200 according to the first embodiment of the present invention. This procedure is a modified example of FIG. 19, wherein steps that are the same as in FIG. 19 are denoted by the same reference numerals and a description thereof will be omitted.

A communication charge is calculated based on measured communication traffic volume and acquired communication unit price information (step S972), and then the accounting processing unit 250 records the calculated communication charge (step S981).

Further, the USIM information restoration instruction information is transmitted to the wireless terminal device on which the transmission process of the second web information has ended (step S975), and then it is determined whether or not there is a purchase manipulation to purchase a product or the like at the time of transmission of the second web information (step S982). When there is a purchase manipulation to purchase a product or the like at the time of transmission of the second web information (step S982), the accounting processing unit 250 records the communication charge recorded at the time of transmission of the second web information in the accounting information of the service requestor of the second web information (step S983). In other words, the communication charge recorded in step S981 is borne by the service requestor of the second web information.

Further, when there is no purchase manipulation to purchase a product or the like at the time of transmission of the second web information (step S982), the accounting processing unit 250 records the communication charge recorded at the time of transmission of the second web information in the accounting information of the wireless terminal device to which the second web information has been transmitted (step S984). In other words, the communication charge recorded in step S981 is borne by the user of the wireless terminal device to which the second web information has been transmitted.

2. Second Embodiment

The first embodiment of the present invention has been described in connection with the example in which content is transmitted using USIM information related to a communication service provider selected by a service requestor (or a web information provider) that requests transmission of the content. Here, efficient content transmission can be performed, for example, in view of a congestion degree of a base station accessible by a wireless terminal device of a content transmission target. In this regard, a second embodiment of the present invention will be described in connection with an example in which content transmission is performed, for example, in view of a congestion degree of a base station accessible by a wireless terminal device of a content transmission target. A configuration of a communication system according to the second embodiment of the present invention is substantially the same as in the first embodiment of the present invention. Thus, the same components as in the first embodiment of the present invention will be denoted by the same reference numerals, and a description thereof will be partially omitted. Further, the second embodiment of the present invention will be described only with respect to content transmission, but can be similarly applied to provision of web information.

[Example Configuration of Information Processing Device]

Figure 22:
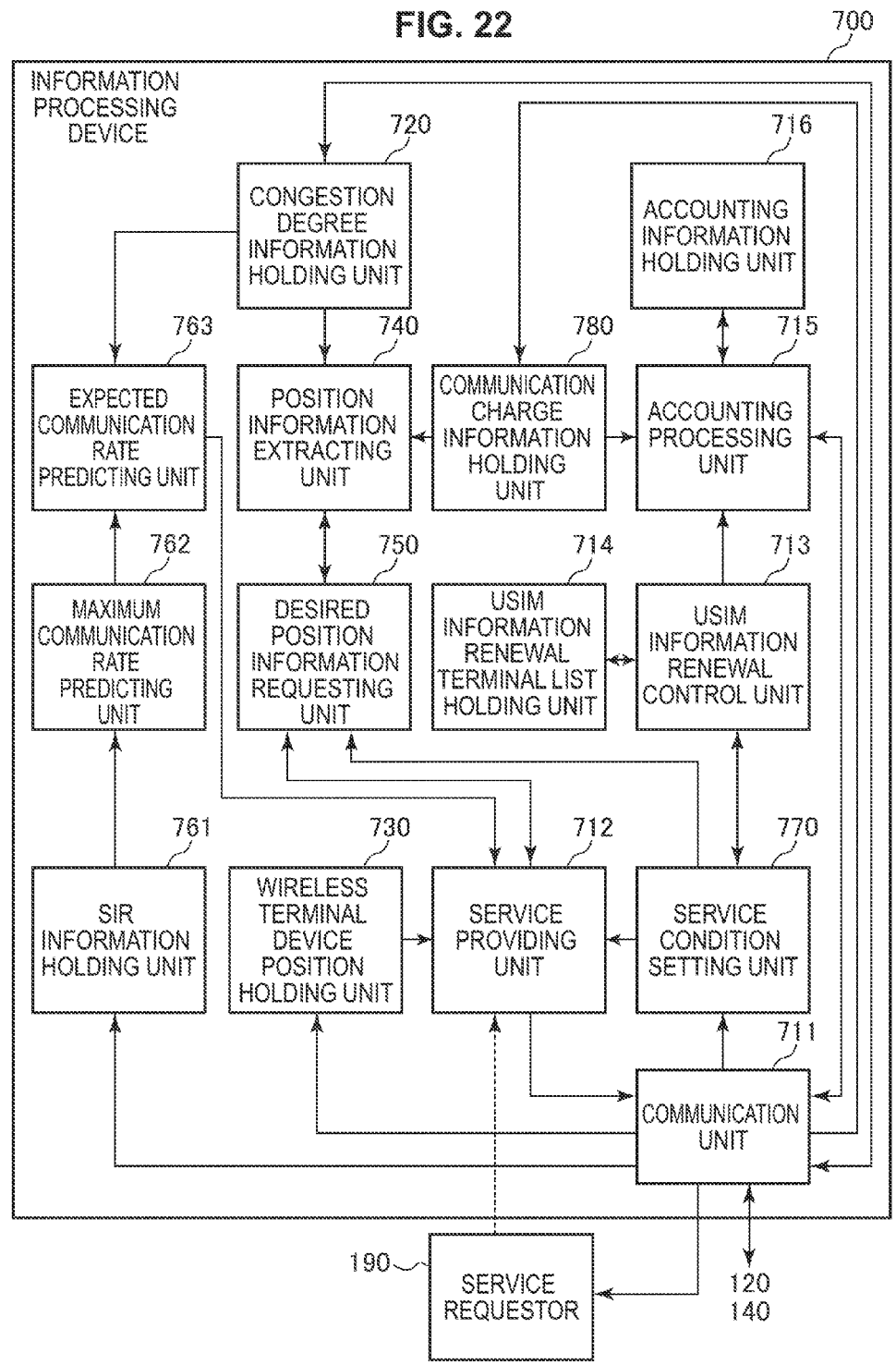
FIG. 22 is a block diagram illustrating an example functional configuration of an information processing device 700 according to a second embodiment of the present invention.

FIG. 22 is a block diagram illustrating an example functional configuration of an information processing device 700 according to the second embodiment of the present invention. The information processing device 700 is a modified example of the information processing device 200 illustrated in FIG. 6. Thus, the same components as in the information processing device 200 are denoted by the same reference numerals and a description thereof is partially omitted.

The information processing device 700 includes a congestion degree information holding unit 720, a wireless terminal device position holding unit 730, a position information extracting unit 740, and a desired position information requesting unit 750. The information processing device 700 further includes a SIR information holding unit 761, a maximum communication rate predicting unit 762, an expected communication rate predicting unit 763, and a service condition setting unit 770.

The congestion degree information holding unit 720 holds congestion degree information in which allocation information of radio resources of one or more base stations, a cell ID of each base station, and a time are associated with one another. Further, information from each base station is acquired by a communication unit 711 through each network control device, and held in the congestion degree information holding unit 720. In other words, the information processing device 700 holds position information of each base station. For example, when position information of each base station is acquired, the position information may be provided directly from each communication service provider. Alternatively, the position information may be acquired through the Internet. Alternatively, the position of each base station may be estimated by acquiring a cell ID, a reception level of a pilot signal, and position information of a wireless terminal device from each wireless terminal device and detecting path loss of each piece of acquired data.

Here, for example, the allocation information of the radio resources is a value calculated based on a ratio of the number of actually allocated channelization codes to the number of all available channelization codes in the CDMA scheme. Or, the allocation information of the radio resources is a value calculated based on a ratio of an actually transmitted output level to a maximum transmission output level.

Further, the allocation information of the radio resources is a numerical value corresponding to a ratio of the number of sub carriers actually allocated by a control channel and the user to the number of all sub carriers of each frame in the OFDMA scheme. Further, even in other radio systems, the allocation information of the radio resources can be defined by similar physical interpretation.

Further, for example, a wireless terminal device in a standby state can acquire information related to a congestion degree of a base station. In this regard, information (congestion degree information) acquired by the wireless terminal device may be acquired by the communication unit 711 and held in the congestion degree information holding unit 720.

For example, in the CDMA scheme, each wireless terminal device performs correlation detection of a pilot signal including a neighboring cell associated with a cell search in the standby state. Thus, the congestion degree can be calculated based on the correlation detection value.

Further, in the OFDMA scheme, allocation information of a sub carrier is transmitted to each wireless terminal device. Thus, the congestion degree can be calculated based on a ratio of the number of actually allocated sub carriers to the number of all sub carriers of each frame included in the information.

Here, the congestion degree information held in the congestion degree information holding unit 720 is displayed to generate information (communication charge information on a congestion degree) related to a communication charge depending on a congestion degree for every one or more communication service providers. Further, the communication charge information depending on the congestion degree can be dynamically changed by each communication service provider.

For example, the congestion degree information is displayed on a display device (not shown) equipped in or connected to the information processing device 700. Further, the congestion degree information held in congestion degree information holding unit 720 is provided to each communication service provider through the communication unit 711, and the congestion degree information is displayed in each communication service provider. As described above, when the congestion degree information is displayed, for example, a file may be downloaded and displayed on a display device. Further, information related to a corresponding communication charge is set in association with the congestion degree information by each communication service provider, and the congestion degree information and the information related to the communication charge are held in a communication charge information holding unit 780 in association with each other.

In other words, the communication charge corresponding to the congestion degree can be obtained based on the congestion degree information associated with a cell ID 781 (shown in FIG. 23) of the communication charge information holding unit 780.

Here, the communication unit 711 acquires information (position information) related to the position of each wireless terminal device from the first network control device 120 or the second network control device 140, and causes the acquired position information to be held in the wireless terminal device position holding unit 730. For example, the communication unit 711 can acquire the position information acquired by the position information acquisition unit 320 equipped in each wireless terminal device through the first network control device 120 or the second network control device 140. Further, the communication unit 711 regularly or irregularly acquires the position information from the first network control device 120 and the second network control device 140, and sequentially updates the position information held in the wireless terminal device position holding unit 730.

As described above, the wireless terminal device position holding unit 730 holds the position information acquired by the communication unit 711 and information (wireless terminal device information (e.g., terminal identification information and communication service provider identification information)) related to a corresponding wireless terminal device in association with each other. Further, the wireless terminal device position holding unit 730 supplies the held position information and the wireless terminal device information to a service providing unit 712. In other words, the position of each wireless terminal device is managed by the wireless terminal device position holding unit 730.

The service condition setting unit 770 sets a content transmission condition when content transmission (content distribution) is performed at a request from the service requestor 190, and outputs the set condition to the desired position information requesting unit 750. For example, the service condition setting unit 770 sets a file name of content of a transmission target, a time zone, information of a transmission region, information related to a transmission target person, a condition related to a communication charge for transmission, and the like.

The desired position information requesting unit 750 requests the position information extracting unit 740 to send position information satisfying the condition set by the service condition setting unit 770, and acquires the requested position information from the position information extracting unit 740. For example, the desired position information requesting unit 750 acquires position information extracted based on the congestion degree from the position information extracting unit 740 when desiring to know a currently available region. Further, the desired position information requesting unit 750 acquires position information extracted based on a communication charge from the position information extracting unit 740 when desiring to know a region that currently has a low communication charge.

The position information extracting unit 740 extracts a place in which a congestion degree satisfies a predetermined condition based on a congestion degree of each base station and the position of each wireless terminal device connected to each base station. Further, the position information extracting unit 740 extracts a place in which a communication charge satisfies a predetermined condition based on communication charge information in each base station and the position of each wireless terminal device connected to each base station. Through the above extraction, the service providing unit 712 can extract a wireless terminal device located where a congestion degree or a communication charge satisfies a predetermined condition. In other words, the service providing unit 712 acquires user information corresponding to the position information (cell ID) extracted by the position information extracting unit 740 from the wireless terminal device position holding unit 730. Further, the service providing unit 712 transmits designated content to a user who fits the condition set by the service condition setting unit 770. In this case, the service providing unit 712 can update the setting information included in the first content based on position information of a target wireless terminal device.

In this example, a predetermined place is extracted based on a congestion degree and a communication charge but the above extraction may be performed based on information such as a communication speed, a cell radius, an advertising browsing ratio, a used communication traffic volume per hour, a used communication charge per hour, or a moving distance within an arbitrary time.

The communication charge information holding unit 780 is a holding unit that holds information (congestion degree information) related to a congestion degree of a base station accessible by each wireless terminal device and information (communication charge information) related to a communication charge in association with each other for each communication service provider. Further, each communication service provider can dynamically update information related to a communication charge based on the relation between supply and demand. Holding content of the communication charge information holding unit 780 will be described in detail with reference to FIG. 23.

Here, the wireless terminal device 300 can detect signal power to interference power (SIR (Signal to Interference Ratio)) as well as a congestion degree. Thus, the SIR information holding unit 761 acquires and holds information related to the SIR detected by one or more wireless terminal devices through the communication unit 711.

Here, as a method of detecting the SIR by the wireless terminal device 300, for example, in the CDMA scheme, a method of detecting based on a signal to noise ratio obtained at the time of correlation detection of a pilot signal may be used. Further, in the OFDMA scheme, for example, a method of detecting based on a signal to noise ratio obtained at the time of correlation detection of a synchronous signal may be used. Further, any other SIR detection method may be used.

The maximum communication rate predicting unit 762 outputs a numerical value that increases as the SIR increases as a maximum communication rate. As a configuration of the maximum communication rate predicting unit 762, a function in which the maximum communication rate increases as the SIR increases may be set, or a table in which a maximum communication rate on each SIR is set in advance may be used.

The expected communication rate predicting unit 763 calculates an expected communication rate based on the congestion degree acquired from the congestion degree information holding unit 720 and the maximum communication rate acquired from the maximum communication rate predicting unit 762. As described above, the expected communication rate is calculated based on the signal to interference power ratio and the congestion degree detected by the wireless terminal device connected to each base station. For example, the expected communication rate predicting unit 763 calculates a value close to the maximum communication rate when the congestion degree is low, and calculates a value that becomes a communication rate lower than the maximum communication rate when the congestion degree is high.

Here, the service providing unit 712 acquires user information corresponding to the position information from the wireless terminal device position holding unit 730 through the desired position information requesting unit 750. Further, when advertising content or the like is distributed to the user, content distribution may be performed after the size of content is set based on information about the communication rate calculated by the expected communication rate predicting unit 763. In other words, the service providing unit 712 may decide the size of content based on the expected communication rate and the position of each wireless terminal device connected to each base station. As described above, when the designated content is distributed, the service providing unit 712 sets the size of content based on the congestion degree of each base station or the expected communication rate. Examples of a content size setting method include file compression and a method of changing a compression ratio.

[Example Content of Congestion Degree Information Holding Unit]

Figure 23:
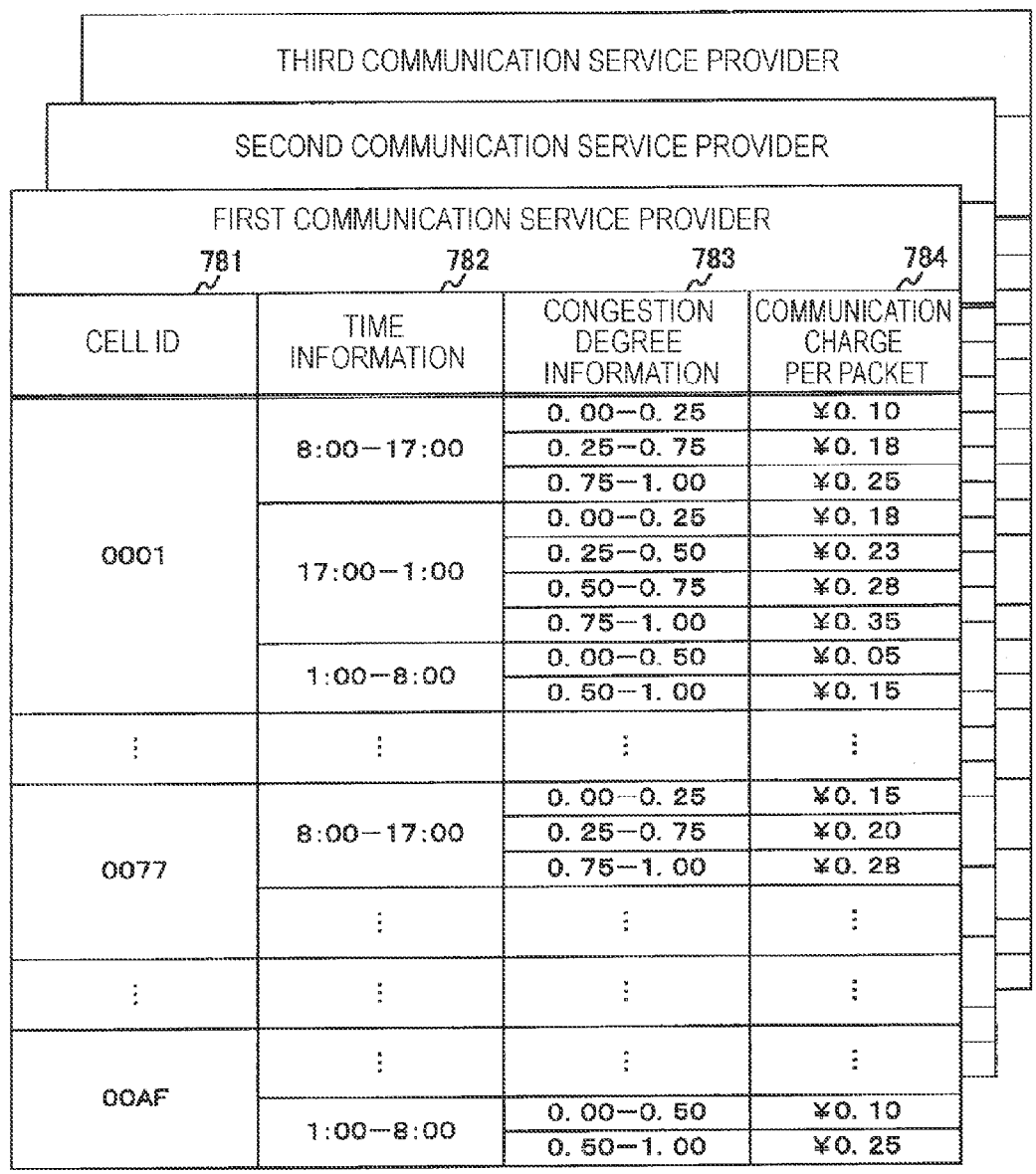
FIG. 23 is a diagram schematically illustrating an example of holding content of a communication charge information holding unit 780 according to the second embodiment of the present invention.

FIG. 23 is a diagram schematically illustrating an example of holding content of the communication charge information holding unit 780 according to the second embodiment of the present invention.

The communication charge information holding unit 780 holds the cell ID 781, time information 782, congestion degree information 783, and a communication charge 784 per packet in association with one another.

The cell ID 781 is identification information used to identify a base station (cell) operated by the communication service provider. The presence position of the base station operated by the communication service provider is identified by the cell ID 781.

The time information 782 is information representing a time zone of a predetermined interval.

The congestion degree information 783 is information related to a congestion degree of a base station operated by the communication service provider. As the congestion degree information 783, for example, a value of 0 to 1 is stored. In FIG. 23, a congestion degree of a value "1" of the congestion degree information 783 is assumed to be highest (i.e., congested), and a congestion degree of "0" is assumed to be lowest (i.e., not congested).

The communication charge 784 per packet is information (communication unit price information) related to a communication charge incurred when a wireless terminal device uses a wireless terminal device through a wireless service provider. In other words, the communication unit price information of the communication service provider related to the USIM information (the renewed USIM information) held in the wireless terminal device is stored. An accounting processing unit 715 performs the accounting process related to the wireless terminal device whose USIM information has been renewed with reference to the communication charge 784 per packet. The communication unit price information may be set according to a congestion degree by which a communication charge changes.

For example, it is assumed that at 11 o'clock, the congestion degree information 783 corresponding to the cell ID 781 of "0001" is "0.30," and the congestion degree information corresponding to the cell ID 781 of "0077" is "0.10." In this case, when a communication charge of each area is acquired at 11 o'clock, a communication charge of "0.18 yen" is acquired in the cell ID 781 "0001," and a communication charge of "0.15 yen" is acquired in the cell ID 781 "0077."

[Example Operation of Information Processing Device]

Next, an operation of the information processing device 700 according to the second embodiment of the present invention will be described with reference to the accompanying drawings.

Figure 24:
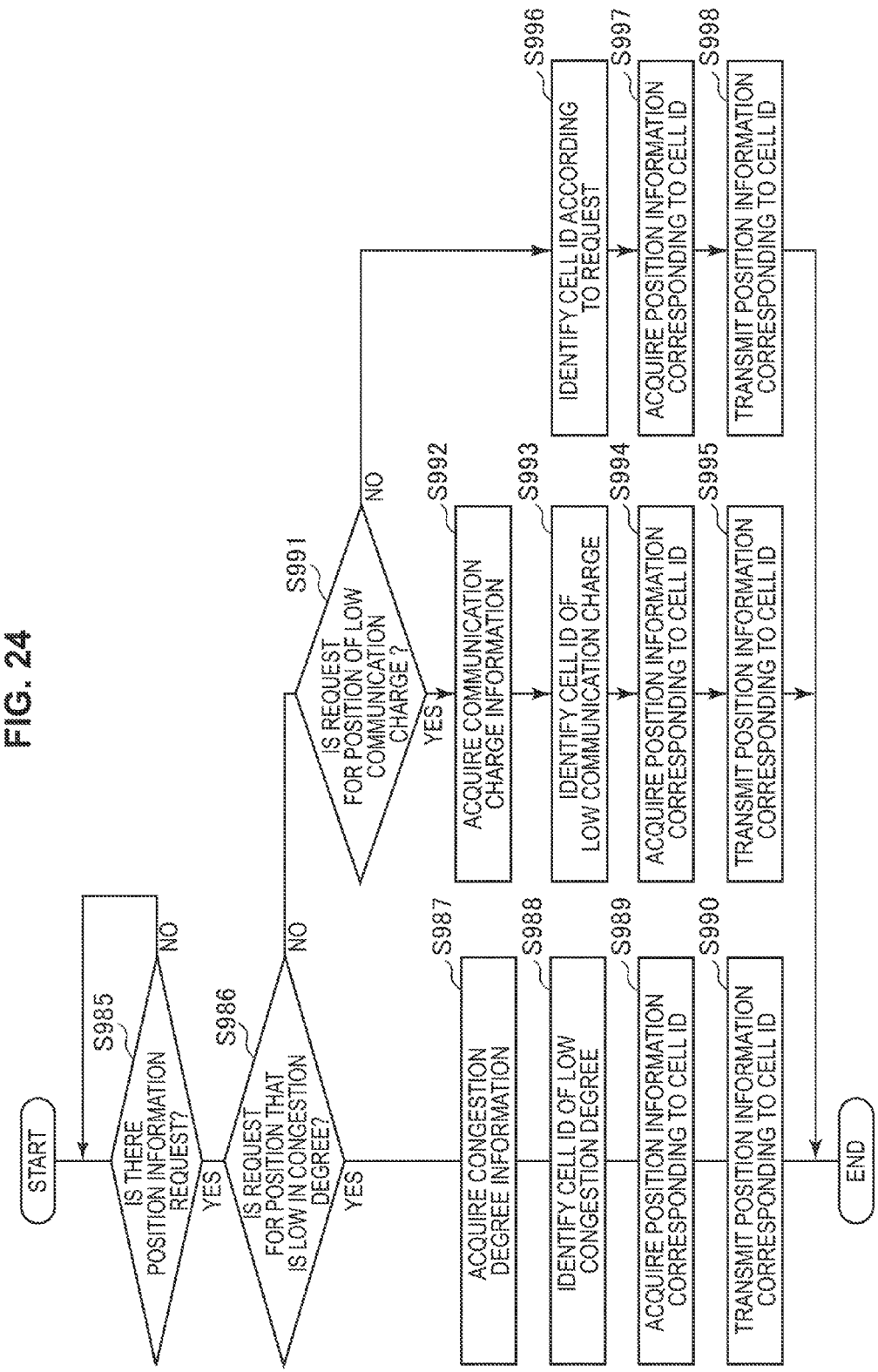
FIG. 24 is a flowchart illustrating an example of a procedure of a position information extraction control process by a position information extracting unit 740 according to the second embodiment of the present invention.

FIG. 24 is a flowchart illustrating an example of a procedure of a position information extraction control process performed by the position information extracting unit 740 according to the second embodiment of the present invention.

First, it is determined whether or not there is a position information request from the desired position information requesting unit 750 (step S985), and when there is no position information request, monitoring is continuously performed. However, when there is a position information request from the desired position information requesting unit 750 (step S985), it is determined whether or not the request is a request for a position that has a low congestion degree (step S986).

When the request is a request for a position that has a low congestion degree (step S986), the congestion degree information is acquired from the congestion degree information holding unit 720 (step S987), and a cell ID of a low congestion degree is identified (step S988). Then, position information corresponding to the identified cell ID is acquired (step S989), and the acquired position information is output to the desired position information requesting unit 750 (step S990).

When the request is not a request for a position that has a low congestion degree (step S986), it is determined whether or not the request is a request for a position that has a low communication charge (step S991). When the request is a request for a position that has a low communication charge (step S991), the communication charge information is acquired from the communication charge information holding unit 780 (step S992), and a cell ID of a low communication charge is identified (step S993). Then, the position information corresponding to the identified cell ID is acquired (step S994), and the acquired position information is output to the desired position information requesting unit 750 (step S995).

When the request is not a request for a position that has a low communication charge (step S991), a cell ID corresponding to the request is identified (step S996). Then, the position information corresponding to the identified cell ID is acquired (step S997), and the acquired position information is output to the desired position information requesting unit 750 (step S998). Steps S985 to S998 are an example of an extraction process set forth in the accompanying claims.

As described above, in the second embodiment of the present invention, when transmission of content is performed, switching to an appropriate communication service provider may be performed according to a communication traffic status, a change in a communication charge, or the like. Further, information related to a communication service provider included in content transmitted from a content distributor may be updated based on a temporal or geographical change in a wireless terminal device. Further, content distribution in which a communication charge is suppressed or content distribution in which a load on traffic is reduced can be performed.

Further, since content can be distributed only to an area that has a low congestion degree, content having a relatively large size can be efficiently provided to the user. Further, after a system in which a communication charge changes according to a congestion degree is introduced, content distribution in which a communication charge is suppressed can be performed. Further, since the size of content is set based on a congestion degree of a cell or an expected communication rate, it is possible to reduce a load on traffic and perform content distribution.

Here, in recent years, user-oriented concierge services are increasing, and particularly, it is considered to be important to a service company to provide a service in a form that minimizes traffic loads based on a user status in a mobile environment.

Further, push-type advertising distribution is considered to be increasing in a mobile environment. In the case of advertising using an electronic mail or the like, a communication charge related to reception thereof is borne by the user. Further, when a large capacity of content such as audio, imaged, or video is added (or linked) to advertising, the user has to bear much communication charge in order to browse the advertising. For this reason, the advertising is unlikely to be browsed by the user. Further, an increase in a communication charge is likely to restrict the spread of mobile advertising.

Further, there is potentially a demand for companies that perform content (e.g., advertising) distribution to bear a low communication charge necessary for distribution. Currently, a constant communication charge is applied to distribution of content (e.g., advertising), but it is preferable to exercise management, for example, such that a market principle is introduced based on demand and supply, and a communication charge related to distribution is made lower when a little-used base station is used.

In this regard, in an embodiment of the present invention, for example, after a small capacity of content (first content) is received, a large capacity of content (second content) is downloaded. Further, when the second content is downloaded, an optimal communication service provider according to a congestion degree can be set. Thus, an appropriate wireless connection service can be provided.

In other words, for example, when advertising is distributed, only a minimal amount of content is transmitted by distribution by a communication service provider network having a contract with the user, and the user' burden is reduced. Thus, for distribution of large-capacity advertising, distribution is performed via a communication service provider network designated by a distribution company, and thus it is possible to make the distribution company bear a fee. Further, since a congestion degree, a fee, or the like can be considered when a communication service provider is designated, a burden of a distribution company can be reduced.

Further, the above embodiment of the present invention has been described in connection with the example in which the information processing devices 200 and 700 are integrally configured. However, the embodiment of the present invention can be applied even to an information processing system in which components included in the information processing device are configured with a plurality of devices. Further, the embodiment of the present invention can be applied to a portable terminal device (e.g., a terminal device dedicated for data communication) other than a portable telephone device or a fixed type wireless terminal device (e.g., a wireless terminal device aimed at data collection of an automatic vending machine).

The embodiment of the present invention is an example of a possible implementation of the present invention, and as can be understood in an embodiment of the present invention, matters in the embodiment of the present invention have a correspondence relation with invention specifying matters set forth in the accompanying claims. Similarly, invention specifying matters set forth in the accompanying claims have a correspondence relation with matters in the embodiment of the present invention having the same names, respectively. However, the present invention is not limited to the above embodiments, and various changes can be made in a scope not departing from the gist of the present invention.

Further, the procedure described in the embodiment of the present invention may be understood as a method having a series of processes, or as a program causing a computer to execute a series of processes, or as a recording medium storing the program. Examples of the recording medium include a hard disk, a CD (Compact Disc), an MD (Mini-Disc), and a DVD (Digital Versatile Disk). Further, a memory card, a Blu-ray disk (a registered trademark), or the like may be used.

The preferred embodiments of the present invention have been described above in detail with reference to the accompanying drawings, whilst the technical scope the present invention is not limited to the above examples, of course. A person skilled in the art may find various alternations and modifications within the scope of the appended claims, and it should be understood that they will naturally come under the technical scope of the present invention.

REFERENCE SIGNS LIST 100 communication system
101 public line network
120 first network control device
121, 141 base station
140 second network control device
200, 700 information processing device
210, 711 communication unit
220, 712 service providing unit
230, 713 USIM information renewal control unit
240, 714 USIM information renewal terminal list holding unit
250, 715 accounting processing unit
260, 716 accounting information holding unit
270, 780 communication charge information holding unit 300 wireless terminal device
310 communication unit
320 position information acquisition unit
330 control unit
340 manipulation reception unit
350 display unit
360 USIM information renewal unit
370 USIM information storage unit
720 congestion degree information holding unit
730 wireless terminal device position holding unit
740 position information extracting unit
750 desired position information requesting unit
761 SIR information holding unit
762 maximum communication rate predicting unit
763 expected communication rate predicting unit
770 service condition setting unit

The invention claimed is:

1. An information processing method, comprising:
   setting, in a wireless terminal device having a first access right to access a first base station related to a first communication service provider via a radio line, a second access right to access a second base station related to a second communication service provider to the wireless terminal device;
   providing a service to the wireless terminal device, to which the second access right is set, through the second base station related to the second communication service provider based on Universal Subscriber Identity Module (USIM) information of the second communication service provider,
   wherein the setting of the second access right includes transmitting setting information, to the wireless terminal device for accessing the second base station related to the second communication service provider, through the first base station related to the first communication service provider; and
   dynamically updating information related to a communication charge associated with one of the first communication service provider or the second communication service provider based on a congestion degree of at least one of the first base station related to the first communication service provider or the second base station related to the second communication service provider, and a position of the wireless terminal device accessing the first communication service provider or the second communication service provider.

2. The information processing method according to claim 1, further comprising:
   transmitting first content including the setting information related to the second communication service provider and second content related to the first content,
   wherein the setting of the second access right to the wireless terminal device is based on a reception of an access request that corresponds to the setting information,
   wherein the reception of the access request is based on the first content transmitted through the first base station related to the first communication service provider, and
   wherein the service includes transmitting the second content to the wireless terminal device to which the second access right is set through the second base station related to the second communication service provider.

3. The information processing method according to claim 1, wherein the setting of the second access right includes updating the setting information related to the second communication service provider based on position information of the wireless terminal device.

4. The information processing method according to claim 1, wherein the setting of the second access right includes transmitting the setting information to set the second access right to the wireless terminal device and setting the second access right to the wireless terminal device based on the setting information.

5. The information processing method according to claim 4,
   wherein the setting information includes the USIM information as first contract authentication information related to the second access right, and
   wherein the setting of the second access right to the wireless terminal device comprises renewing second contract authentication information held in the wireless terminal device to the first contract authentication information included in the transmitted setting information.

6. The information processing method according to claim 4,
   wherein the wireless terminal device holds first contract authentication information related to the first access right and second contract authentication information related to the second access right, and sets the second access right based on the first contract authentication information and the second contract authentication information,
   wherein the setting information includes validation information to set the second access right, and
   wherein the setting of the second access right to the wireless terminal device comprises validating the second contract authentication information, related to the second access right held in the wireless terminal device, based on the validation information included in the transmitted setting information.

7. The information processing method according to claim 1, further comprising:
   restoring the first access right to the wireless terminal device based on completion of the service through the second base station related to the second communication service provider.

8. The information processing method according to claim 1, further comprising:
   charging a fee for a communication of the wireless terminal device with the second communication service provider, wherein the wireless terminal device accesses the second base station related to the second communication service provider based on the set second access right.

9. The information processing method according to claim 1, further comprising:
   extracting first information of the wireless terminal device that is in a place in which the congestion degree satisfies a condition,
   wherein the condition is based on:
       a first congestion degree of the first base station related to the first communication service provider and the position of the wireless terminal device accessing the first base station related to the first communication service provider or the second base station related to the second communication service provider, and
       a second congestion degree of the second base station related to the second communication service provider and the position of the wireless terminal device accessing the first base station related to the first communication service provider or the second base station related to the second communication service provider.

10. The information processing method according to claim 9, wherein the extracting includes acquiring one of the first congestion degree or the second congestion degree from the wireless terminal device accessible to a corresponding one of the first base station or the second base station.

11. The information processing method according to claim 1, further comprising:
deciding a size of advertisement content based on at least one of a communication rate, the congestion degree detected by the wireless terminal device, or the position of the wireless terminal device,
wherein the communication rate is calculated based on a signal to interference ratio (SIR) detected by the wireless terminal device, and
wherein the wireless terminal device accesses one of the first base station or the second base station.

12. The information processing method according to claim 1, further comprising:
extracting information of the wireless terminal device that is in a place in which the communication charge satisfies a condition,
wherein the condition is based on:
first communication charge information in the first base station related to the first communication service provider and the position of the wireless terminal device accessing one of the first base station or the second base station, and
second communication charge information in the second base station related to the second communication service provider and the position of the wireless terminal device accessing one of the first base station or the second base station.

13. An information processing device, comprising:
at least one processor configured to:
set, in a wireless terminal device having a first access right to access a first base station related to a first communication service provider via a radio line, a second access right to access a second base station related to a second communication service provider to the wireless terminal device;
provide a service to the wireless terminal device, to which the second access right is set, through the second base station related to the second communication service provider based on Universal Subscriber Identity Module (USIM) information of the second communication service provider;
set the second access right based on a transmission of setting information, to the wireless terminal device for access to the second base station related to the second communication service provider, through the first base station related to the first communication service provider; and
dynamically update information related to a communication charge associated with one of the first communication service provider or the second communication service provider based on a congestion degree of at least one of the first base station related to the first communication service provider or the second base station related to the second communication service provider, and a position of the wireless terminal device accessing the first communication service provider or the second communication service provider.

14. A communication system, comprising:
a wireless terminal device having a first access right to access a first base station related to a first communication service provider; and
an information processing device that includes at least one processor configured to:
set, in the wireless terminal device having the first access right to access the first base station related to the first communication service provider via a radio line, a second access right to access a second base station related to a second communication service provider to the wireless terminal device;
provide a service to the wireless terminal device, to which the second access right is set, through the second base station related to the second communication service provider based on Universal Subscriber Identity Module (USIM) information of the second communication service provider;
set the second access right based on a transmission of setting information, to the wireless terminal device for access to the second base station related to the second communication service provider, through the first base station related to the first communication service provider; and
dynamically update information related to a communication charge associated with one of the first communication service provider or the second communication service provider based on a congestion degree of at least one of the first base station related to the first communication service provider or the second base station related to the second communication service provider, and a position of the wireless terminal device accessing the first communication service provider or the second communication service provider.

* * * * *